United States Patent
Liu et al.

(10) Patent No.: US 12,412,359 B2
(45) Date of Patent: Sep. 9, 2025

(54) METHOD FOR ELIMINATING INTERFERENCE PATTERN IN IMAGE, AND APPARATUS

(71) Applicant: Honor Device Co., Ltd., Shenzhen (CN)

(72) Inventors: Wenzhao Liu, Shenzhen (CN); Xiaogang Feng, Shenzhen (CN); Kun Ma, Shenzhen (CN); Chao Chen, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/007,636

(22) PCT Filed: Sep. 8, 2022

(86) PCT No.: PCT/CN2022/117921
§ 371 (c)(1),
(2) Date: Dec. 1, 2022

(87) PCT Pub. No.: WO2023/116063
PCT Pub. Date: Jun. 29, 2023

(65) Prior Publication Data
US 2024/0233303 A1    Jul. 11, 2024

(30) Foreign Application Priority Data
Dec. 23, 2021  (CN) .......................... 202111594531.4

(51) Int. Cl.
*G06V 10/147*  (2022.01)
*G01B 11/22*   (2006.01)
(Continued)

(52) U.S. Cl.
CPC ............ *G06V 10/147* (2022.01); *G01B 11/22* (2013.01); *G01B 11/2441* (2013.01); *G06T 7/521* (2017.01); *G06V 40/16* (2022.01)

(58) Field of Classification Search
CPC ...... G06V 10/147; G06V 40/16; G01B 11/22; G01B 11/2441; G06T 7/521; G06T 5/77;
(Continued)

(56) References Cited

U.S. PATENT DOCUMENTS 7,360,708 B2    4/2008  Miyake et al.
10,451,713 B2   10/2019 Demirtas et al.
(Continued)

FOREIGN PATENT DOCUMENTS

CN    109711255 A    5/2019
CN    109863418 A    6/2019
(Continued)

OTHER PUBLICATIONS

Bai Sizhong, "Distance measurement between bus devices based on RS485 data frame timing", Industrial and Mining Automation, vol. 47, No. 7m Jul. 21, 2021, 7 pages.
(Continued)

*Primary Examiner* — Mariam Qureshi
(74) *Attorney, Agent, or Firm* — Conley Rose, P.C.

(57) ABSTRACT

Embodiments include a method for eliminating an interference pattern in an image, and an apparatus, and relate to the image processing field, which can eliminate an interference pattern in an image collected by a time-of-flight (ToF) sensor arranged under a display screen of an electronic device. The method includes: obtaining, by the electronic device in advance, K interference patterns corresponding to K different values of a same parameter one by one; collecting, by the electronic device, a first image, and measuring a first parameter value in a case that the first image is collected; deter- (Continued)

mining a first interference pattern in the K interference patterns according to the first parameter value, and determining the second interference pattern according to the first interference pattern; and eliminating the second interference pattern in the first image, so that the processed first image does not include the interference pattern.

20 Claims, 15 Drawing Sheets

(51) Int. Cl.
*G01B 11/24* (2006.01)
*G06T 7/521* (2017.01)
*G06V 40/16* (2022.01)

(58) Field of Classification Search
CPC .......... G01S 7/497; G01S 17/10; G01S 17/36; G01S 17/42; G01S 17/86; G01S 17/894; H04N 23/73
See application file for complete search history.

(56) References Cited

U.S. PATENT DOCUMENTS

| | | | |
|---|---|---|---|
| 11,256,121 B2 | 2/2022 | Zha | |
| 11,788,834 B2 | 10/2023 | Stoutamire et al. | |
| 2014/0071229 A1* | 3/2014 | Weerasinghe | ... H04N 21/26258 348/E13.001 |
| 2016/0260261 A1 | 9/2016 | Hsu | |
| 2020/0103224 A1 | 4/2020 | Montgomery et al. | |
| 2020/0309909 A1 | 10/2020 | Zhang et al. | |
| 2020/0326563 A1* | 10/2020 | Suess | ...................... G01S 17/10 |
| 2020/0358891 A1 | 11/2020 | Heo et al. | |
| 2021/0258498 A1 | 8/2021 | Gove et al. | |
| 2021/0325514 A1 | 10/2021 | Amaya-Benitez | |
| 2024/0004079 A1* | 1/2024 | Yang | ...................... H04N 23/50 |

FOREIGN PATENT DOCUMENTS

| | | |
|---|---|---|
| CN | 110275340 A | 9/2019 |
| CN | 110770534 A | 2/2020 |
| CN | 111678457 A | 9/2020 |
| CN | 112532858 A | 3/2021 |
| CN | 112541875 A | 3/2021 |
| CN | 112596069 A | 4/2021 |
| CN | 112651286 A | 4/2021 |
| CN | 213879945 U | 8/2021 |
| CN | 113382154 A | 9/2021 |
| CN | 113396312 A | 9/2021 |
| JP | 2019074477 A | 5/2019 |

OTHER PUBLICATIONS

Hu, G., et al., "An integrated strategy for the identification and screening of anti-allergy components from natural products based on calcium fluctuations and cell extraction coupled with HPLC-Q-TOF-MS", Analytical and Bioanalytical Chemistry, Aug. 20, 2021, 14 pages.

* cited by examiner (a)

(b)

(a)          (b)

METHOD FOR ELIMINATING INTERFERENCE PATTERN IN IMAGE, AND APPARATUS

CROSS-REFERENCE TO RELATED APPLICATIONS

This application is a U.S. National Stage of International Application No. PCT/CN2022/117921 filed on Sep. 8, 2022, which claims priority to Chinese Patent application Ser. No. 20/211,1594531.4 filed with the China National Intellectual Property Administration on Dec. 23, 2021, both of which are incorporated herein by reference in their entireties.

TECHNICAL FIELD

This application relates to the image processing field, and in particular, to a method for eliminating an interference pattern in an image, and an apparatus.

BACKGROUND

According to a time of flight (time of flight, ToF) technology, light pulses are continuously emitted, and then a light pulse returned by a to-be-measured object is received by using a sensor, and subsequently, a round-trip time or a phase difference of the light pulse is measured to obtain distance and depth data of the to-be measured-object, thereby obtaining a three-dimensional model of the to-be-measured object. A three-dimensional contour of the to-be-measured object can be accurately measured by using the ToF.

By applying the ToF to an electronic device such as a mobile phone, functions such as three-dimensional face unlock, facial recognition payment, and face beautification can be implemented. A growing quantity of electronic devices such as mobile phones are mounted with ToF assembles. However, existing ToF assemblies need to be arranged on frames of the electronic devices, which may occupy display areas of screens and cause full screens cannot be truly archived, thereby affecting user experience.

SUMMARY

Embodiments of this application provide a method for eliminating an interference pattern in an image, and an apparatus, which can enable a ToF assembly to be arranged under a screen of an electronic device, and achieve the same measurement precision as that when the ToF assembly is arranged on a frame.

To achieve the foregoing objective, the following technical solutions are used in the embodiments of this application:

According to a first aspect, a method for eliminating an interference pattern in an image is provided. The method is applicable to an electronic device, and the electronic device includes a display screen. A ToF sensor is arranged under the display screen, and the ToF sensor includes an emitting unit and a receiving unit. The method includes: obtaining K interference patterns, where the K interference patterns correspond to K different values of a same parameter, and each of the interference patterns is a bright-dark concentric ring generated in a case that laser emitted by the emitting unit passes through the display screen; collecting, by the receiving unit, a first image, and measuring a first parameter value in a case that the receiving unit collects the first image; determining a first interference pattern in the K interference patterns, where the first interference pattern corresponds to a second parameter value, and a difference between the second parameter value and the first parameter value is less than or equal to a first value; and eliminating a second interference pattern in the first image, where the second interference pattern is determined according to the first interference pattern.

Since an interference pattern is generated in a case that laser passes through the display screen, there may be an interference pattern in an image collected by a ToF under a screen (the ToF sensor arranged under the display screen). In addition, a wavelength of the laser changes with temperatures, and a change in the wavelength of the laser may cause the interference pattern to be changed constantly. In this method, a plurality of interference patterns are obtained in advance. After the ToF sensor collects the first image, the first interference pattern that is approximate to an interference pattern in the first image is obtained in the plurality of interference patterns, and the second interference pattern is determined according to the first interference pattern. In this way, the second interference pattern in the first image can be eliminated, thereby eliminating the interference pattern in the first image. In addition, the ToF sensor can be enabled to be arranged under the screen of the electronic device, and measurement precision that is the same as that when the ToF sensor is arranged on the frame is achieved.

With reference to the first aspect, in a possible implementation, the detected parameter may be a temperature in a case that the receiving unit collects the image, or a wavelength of the laser emitted by the emitting unit, or an exposure time for the receiving unit to collect the image, or ambient light intensity in a case that the receiving unit collects the image.

The wavelength of the laser emitted by the ToF under the screen changes with the ambient light intensity. In a case that ambient light is dark (the ambient light intensity is weak), the exposure time of the ToF is long, a temperature of a laser emitter rises, and the wavelength of the laser is lengthened. In a case that the ambient light is bright (the ambient light intensity is strong), the exposure time of the ToF is short, the temperature of the laser emitter decreases, and the wavelength of the laser is shortened. In a case that the wavelength of the laser emitted by the ToF under the screen changes, a radius of each circular ring in the interference pattern changes. In this method, the interference pattern may be determined by detecting the wavelength of the laser, or may be determined by detecting the temperature of the ToF, or may be determined by detecting the exposure time during image collection, or may be determined by detecting the ambient light intensity around the ToF under the screen. Certainly, the interference pattern may also be determined by detecting another parameter that can cause the wavelength to be changed or a parameter that can reflect the change of the wavelength.

With reference to the first aspect, in a possible implementation, that the second interference pattern is determined according to the first interference pattern includes: the second interference pattern being the first interference pattern. For example, in a case that the first parameter value is equal to the second parameter value, the first interference pattern is directly determined as the second interference pattern. For example, in a case that the difference between the first parameter value and the second parameter value is less than a preset threshold, the first interference pattern is directly determined as the second interference pattern.

With reference to the first aspect, in a possible implementation, that the second interference pattern is determined according to the first interference pattern includes: the second interference pattern being generated by enlarging a radius of each circular ring in the first interference pattern; or the second interference pattern being generated by decreasing a radius of each circular ring in the first interference pattern.

With reference to the first aspect, in a possible implementation, when the parameter is the temperature in a case that the receiving unit collects the image, or the wavelength of the laser emitted by the emitting unit, or the exposure time for the receiving unit to collect the image, that the second interference pattern is determined according to the first interference pattern includes: in a case that the first parameter value is greater than the second parameter value, the second interference pattern being generated by enlarging the radius of each circular ring in the first interference pattern; or in a case that the first parameter value is less than the second parameter value, the second interference pattern being generated by decreasing a radius of each circular ring in the first interference pattern.

With reference to the first aspect, in a possible implementation, when the parameter is the ambient light intensity in a case that the receiving unit collects the image, that the second interference pattern is determined according to the first interference pattern includes: in a case that the first parameter value is less than the second parameter value, the second interference pattern being generated by enlarging a radius of each circular ring in the first interference pattern; or in a case that the first parameter value is greater than the second parameter value, the second interference pattern being generated by decreasing a radius of each circular ring in the first interference pattern.

With reference to the first aspect, in a possible implementation, enlarging or decreasing the radius of each circular ring in the first interference pattern includes: an enlarged value or a decreased value of a radius of a circular ring of an $m_i$th interference order in the first interference pattern being:

$$(4f^2h^2n)/\lambda^2m_i^2\sqrt{\frac{4f^2h^2n^2}{\lambda^2m_i^2}-f^2},$$

where $\lambda$ is a wavelength of laser emitted by the emitting unit, f is a focal length of a lens of the ToF sensor, n is a refractive index of a screen layer in which refraction occurs in the display screen, and h is a thickness of the screen layer in which refraction occurs in the display screen.

With reference to the first aspect, in a possible implementation, that each of the interference patterns is generated in a case that laser emitted by the emitting unit passes through the display screen includes: each of the interference patterns being generated in a case that the laser emitted by the emitting unit is reflected by an object to the receiving unit after passing through the display screen, and/or being generated in a case that the laser emitted by the emitting unit passes through the display screen and is transmitted to the receiving unit after being reflected by the object. That is, only the emitting unit of the ToF sensor may be arranged under the display screen, or only the receiving unit of the ToF sensor may be arranged under the display screen, or both the emitting unit and the receiving unit of the ToF sensor may be arranged under the display screen.

With reference to the first aspect, in a possible implementation, in a case that a difference between a third parameter value and the first parameter value is equal to the difference between the second parameter value and the first parameter value, the second parameter value is greater than the third parameter value. That is, in a case that differences between two of K values and the first parameter value are equal, the larger one of the two values is determined as the second parameter value.

According to a second aspect, this application provides an electronic device, including: a memory, a display screen, a ToF sensor arranged under the display screen, and one or more processors. The memory, the display screen, the ToF sensor are coupled to the one or more processors. The memory stores computer program code. The computer program code includes a computer instruction. The computer instruction, when executed by the processor, causes the electronic device to perform the method described in the first aspect and any possible design manner thereof.

According to a third aspect, this application provides an electronic device, including a memory, a display screen, a ToF sensor arranged under the display screen, and one or more processors, where the ToF sensor includes an emitting unit and a receiving unit. The memory, the display screen, the ToF sensor are coupled to the one or more processors. The memory stores computer program code. The computer program code includes a computer instruction. The computer instruction, when executed by the processor, causes the electronic device to perform the following steps:

obtaining K interference patterns, where the K interference patterns correspond to K different values of a same parameter, and each of the interference patterns is a bright-dark concentric ring generated in a case that laser emitted by the emitting unit passes through the display screen; collecting, by the receiving unit, a first image, and measuring a first parameter value in a case that the receiving unit collects the first image; determining a first interference pattern in the K interference patterns, where the first interference pattern corresponds to a second parameter value, and a difference between the second parameter value and the first parameter value is less than or equal to a first value; and eliminating a second interference pattern in the first image, where the second interference pattern is determined according to the first interference pattern.

Since an interference pattern is generated in a case that laser passes through the display screen, there may be an interference pattern in an image collected by the ToF under the screen (the ToF sensor arranged under the display screen). In addition, a wavelength of the laser changes with temperatures, and therefore a change in the wavelength of the laser may cause the interference pattern to be change constantly. In this method, a plurality of interference patterns are obtained in advance. After the ToF sensor collects the first image, the first interference pattern that is most approximate to an interference pattern in the first image is obtained in the plurality of interference patterns, and the second interference pattern is determined according to the first interference pattern. In this way, the second interference pattern in the first image can be eliminated, thereby eliminating the interference pattern in the first image. In addition, the ToF sensor can be enabled to be arranged under the screen of the electronic device, and measurement precision that is the same as that when the ToF sensor is arranged on the frame is achieved.

With reference to the third aspect, in a possible implementation, the detected parameter may be a temperature in a case that the receiving unit collects an image, or a wavelength of laser emitted by the emitting unit, or an exposure time for the receiving unit to collect an image, or ambient light intensity in a case that the receiving unit collects an image.

A wavelength of laser emitted by the ToF under the screen changes with the ambient light intensity. In a case that ambient light is dark (the ambient light intensity is weak), an exposure time of the ToF is long, a temperature of a laser emitter rises, and the wavelength of the laser is lengthened. In a case that the ambient light is bright (the ambient light intensity is strong), the exposure time of the ToF is short, the temperature of the laser emitter decreases, and the wavelength of the laser is shortened. In a case that the wavelength of the laser emitted by the ToF under the screen changes, a radius of each circular ring in the interference pattern changes. In this method, the interference pattern may be determined by detecting the wavelength of the laser, or may be determined by detecting the temperature of the ToF, or may be determined by detecting the exposure time during image collection, or may be determined by detecting the ambient light intensity around the ToF under the screen. Certainly, the interference pattern may also be determined by detecting another parameter that can cause the wavelength to be changed or a parameter that can reflect the change of the wavelength.

With reference to the third aspect, in a possible implementation, that the second interference pattern is determined according to the first interference pattern includes: the second interference pattern being the first interference pattern. For example, in a case that the first parameter value is equal to the second parameter value, the first interference pattern is directly determined as the second interference pattern. For example, in a case that the difference between the first parameter value and the second parameter value is less than a preset threshold, the first interference pattern is directly determined as the second interference pattern.

With reference to the third aspect, in a possible implementation, that the second interference pattern is determined according to the first interference pattern includes: the second interference pattern being generated by enlarging a radius of each circular ring in the first interference pattern; or the second interference pattern being generated by decreasing the radius of each circular ring in the first interference pattern.

With reference to the third aspect, in a possible implementation, when the parameter is the temperature in a case that the receiving unit collects the image, or the wavelength of the laser emitted by the emitting unit, or the exposure time for the receiving unit to collect the image, that the second interference pattern is determined according to the first interference pattern includes: in a case that the first parameter value is greater than the second parameter value, the second interference pattern being generated by enlarging the radius of each circular ring in the first interference pattern; or in a case that the first parameter value is less than the second parameter value, the second interference pattern being generated by decreasing the radius of each circular ring in the first interference pattern.

With reference to the third aspect, in a possible implementation, when the parameter is the ambient light intensity in a case that the receiving unit collects the image, that the second interference pattern is determined according to the first interference pattern includes: in a case that the first parameter value is less than the second parameter value, the second interference pattern being generated by enlarging the radius of each circular ring in the first interference pattern; or in a case that the first parameter value is greater than the second parameter value, the second interference pattern being generated by decreasing the radius of each circular ring in the first interference pattern.

With reference to the third aspect, in a possible implementation, enlarging or decreasing the radius of each circular ring in the first interference pattern includes: an enlarged value or a decreased value of a radius of a circular ring of an $m_i$th interference order in the first interference pattern being:

$$(4f^2h^2n)/\lambda^2 m_i^2 \sqrt{\frac{4f^2h^2n^2}{\lambda^2 m_i^2} - f^2},$$

where $\lambda$ is a wavelength of laser emitted by the emitting unit, f is a focal length of a lens of the ToF sensor, n is a refractive index of a screen layer in which refraction occurs in the display screen, and h is a thickness of the screen layer in which refraction occurs in the display screen.

With reference to the third aspect, in a possible implementation, that each of the interference patterns is generated in a case that laser emitted by the emitting unit passes through the display screen includes: each of the interference patterns being generated in a case that the laser emitted by the emitting unit is reflected by an object to the receiving unit after passing through the display screen, and/or being generated in a case that the laser emitted by the emitting unit passes through the display screen to be transmitted to the receiving unit after being reflected by the object. That is, only the emitting unit of the ToF sensor may be arranged under the display screen, or only the receiving unit of the ToF sensor may be arranged under the display screen, or both the emitting unit and the receiving unit of the ToF sensor may be arranged under the display screen.

With reference to the third aspect, in a possible implementation, in a case that a difference between a third parameter value and the first parameter value is equal to the difference between the second parameter value and the first parameter value, the second parameter value is greater than the third parameter value. That is, in a case that differences between two of K values and the first parameter value are equal, the larger one of the two values is determined as the second parameter value.

According to a fourth aspect, an electronic device is provided. The electronic device has a function of performing the method in the foregoing first aspect. The function may be implemented by using hardware, or may be implemented by hardware executing corresponding software. The hardware or software includes one or more modules corresponding to the above function.

According to a fifth aspect of this application, a computer-readable storage medium is provided. The computer-readable storage medium stores instructions. The instructions, when run on a computer, causes the computer to perform the method for eliminating an interference pattern in an image described in any one of implementations of the first aspect.

According to a sixth aspect, a computer program product including instructions is provided. The instructions, when run on a computer, causes the computer to perform the method for eliminating an interference pattern in an image described in any one of implementations of the first aspect.

According to a seventh aspect, an apparatus (which may be, for example, a chip system) is provided. The apparatus includes a processor, configured to support an electronic device in implementing a function involved in the first aspect. In a possible design, the apparatus further includes a memory. The memory is configured to store a program instruction and data necessary to the electronic device. The chip system, when being a chip system, may include a chip, or may include a chip and another discrete device.

For the technical effects brought by any one of the design manners in the second aspect to the seventh aspect, reference may be made to the technical effects brought by different design manners in the first aspect, and details are not described herein again.

DESCRIPTION OF EMBODIMENTS

Figure 1:
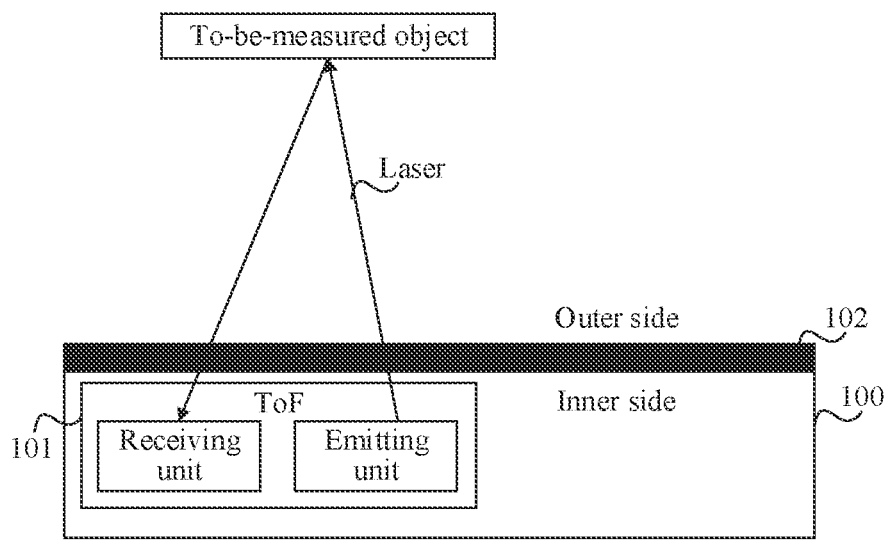
FIG. 1 is a schematic diagram of a scenario to which a method for eliminating an interference pattern in an image is applicable according to an embodiment of this application.

Technical solutions in embodiments of this application are described under with reference to the accompanying drawings in the embodiments of this application. In descriptions of the embodiments of this application, terms used in the following embodiments are only intended to describe particular embodiments, and are not intended to limit this application. As used in this specification and the claims of this application, a singular expression form, "a", "the", "foregoing", "the", or "this", is intended to also include a "one or more" expression form, unless clearly indicated to the contrary in the context. It should be further understood that, in the following embodiments of this application, "at least one" and "one or more" mean one, two or more than two. The term "and/or" describes an association between associated objects and indicates that three associations may exist. For example, A and/or B may indicate that only A exists, both A and B exist, and only B exists, where A and B may be singular or plural. The character "/" generally indicates an "or" relationship between the associated objects.

Reference to "one embodiment" or "some embodiments" described in this specification means that a specific characteristic, structure or feature described in combination with this embodiment is included in one or more embodiments of this application. Therefore, the statements "in one embodiment", "in some embodiments". "in some other embodiments", "in other embodiments", and the like in the differences in this specification do not necessarily refer to the same embodiment, but mean "one or more but not all embodiments", unless otherwise specially emphasized in other ways. The terms "include", "contain", "have" and their variations mean "including but not limited to", unless otherwise specially emphasized in other ways. The term "connection" includes a direct connection and an indirect connection, unless otherwise specified. The terms "first" and "second" are used for descriptive purposes only and should not be construed as indicating or implying relative importance or implicitly indicating a quantity of technical features indicated.

In the embodiments of this application, the term such as "exemplarily" or "for example" is used to represent giving an example, an illustration, or a description. Any embodiment or design solution described by using "exemplarily" or "for example" in the embodiments of this application should not be explained as being more preferred or having more advantages than another embodiment or design solution. Exactly, use of the term such as "exemplarily" or "for example" is intended to present a related concept in a specific manner.

Lase is emitted by a ToF assembly, and then returns back to the ToF assembly after being reflected by a to-be-measured object. The ToF assembly calculates a distance to the to-be-measured object according to a time required for the laser to fly to the to-be-measured object and return back after being reflected by the to-be-measured object, thereby obtaining a three-dimensional model of the measured object. A three-dimensional contour of the to-be-measured object can be accurately measured by using the ToF. For example, in a case that the to-be-measured object is a face, a three-dimensional image of the face may be accurately obtained.

Figure 2A:
FIG. 2A is a schematic diagram of an example to which a method for eliminating an interference pattern in an image is applicable according to an embodiment of this application.
Figure 2B:
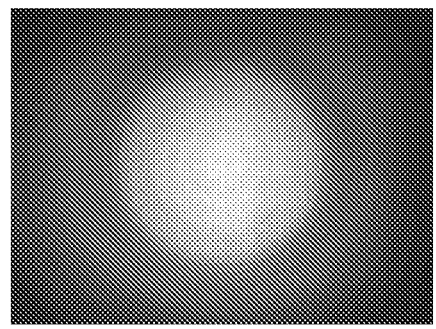
FIG. 2B is a schematic diagram of an interference pattern.

To expand a size of a screen of an electronic device as much as possible, arrangement of the ToF assembly under the screen of the electronic device is a future development trend. However, an interference pattern may be generated in a case that the laser emitted by the ToF assembly passes through the screen. Exemplarily, as shown in FIG. 1, a ToF assembly 101 is arranged in an electronic device 100, and the ToF assembly 101 is arranged under a screen 102. In an embodiment of this application, an inner side of the screen of the electronic device is regarded as a lower side, and an outer side of the screen of the electronic device is regarded as an upper side. It may be understood that, in this embodiment of this application, that the ToF assembly is arranged under the screen means that the ToF assembly is arranged on a side of the screen facing the electronic device. In this way, laser emitted by a laser emitting unit of the ToF assembly can pass through the screen at least once in a journey during which the laser is reflected by a to-be-measured object and then reaches a receiving unit. The laser is reflected between different screen layers of the screen for many times to form equal inclination interference. In this case, an image collected by the ToF assembly includes a ring-shaped interference pattern. Exemplarily, as shown in FIG. 2A, a ring-shaped interference pattern is superimposed on an image of the to-be-measured object. As shown in FIG. 2B, the interference pattern is a bright-dark concentric ring.

It should be noted that, in FIG. 1, an example in which the ToF assembly includes an emitting unit and a receiving unit is used. The emitting unit is configured to emit laser, and the receiving unit is configured to receive the laser. Both the emitting unit and the receiving unit are arranged under the screen. The laser passes through the screen once when flying from the emitting unit to the to-be-measured object, and the laser passes through the screen once when returning from the to-be-measured object to the receiving unit. In some other embodiments, only the emitting unit or the receiving unit of the ToF assembly may be arranged under the screen. The laser passes through the screen once when flying from the emitting unit to the to-be-measured object, or the laser passes through the screen once when returning from the to-be-measured object to the receiving unit. In some other embodiments, the emitting unit may not be distinguished from the receiving unit in the ToF assembly, and functions of the foregoing emitting unit and receiving unit are implemented by a same unit. The laser passes through the screen once when flying from the ToF assembly to the to-be-measured object, and the laser passes through the screen once when returning from the to-be-measured object to the ToF assembly. Based on the above, a ring-shaped interference pattern is generated in a case that the laser emitted by the ToF assembly passes through the screen at least once on the way back to the ToF assembly.

Figure 2C:
FIG. 2C is a schematic diagram of an example of a method for eliminating an interference pattern in an image according to an embodiment of this application.

The image collected by the ToF assembly includes an interference pattern, which affects user's experience of using the electronic device. For example, in a case that security verification such as face unlock and facial recognition payment is performed by collecting a three-dimensional image of a face through the ToF assembly; extraction of three-dimensional information is severely interfered by the interference pattern, thereby weakening security of the face unlock and facial recognition payment. An embodiment of this application provides a method for eliminating an interference pattern in an image, which can effectively eliminate the interference pattern in the image collected by the ToF assembly under the screen (the ToF assembly arranged under the screen of the electronic device), thereby enabling the ToF assembly to achieve the same measurement precision as that of a ToF assembly without a screen. Exemplarily, FIG. 2C shows an image of the to-be-measured object obtained after the ring-shaped interference pattern (the bright-dark concentric ring) in the image shown in FIG. 2A and collected by the ToF assembly is eliminated by using the method for eliminating an interference pattern in an image provided in this embodiment of this application.

The method for eliminating an interference pattern in an image provided in this application may be applied to an electronic device including a ToF assembly under a screen. The foregoing electronic device may include a mobile phone, a tablet computer, a notebook computer, a personal computer (personal computer, PC), an ultra-mobile personal computer (ultra-mobile personal computer, UMPC), a handheld computer, a netbook, a smart home device (such as a smart television, a smart screen, a large screen, a smart speaker, or a smart air conditioner), a personal digital assistant (personal digital assistant, PDA), a wearable device (such as a smart watch or a smart bracelet), an in-vehicle device, a virtual reality device, or the like. This is not limited in this embodiment of this application.

Figure 3:
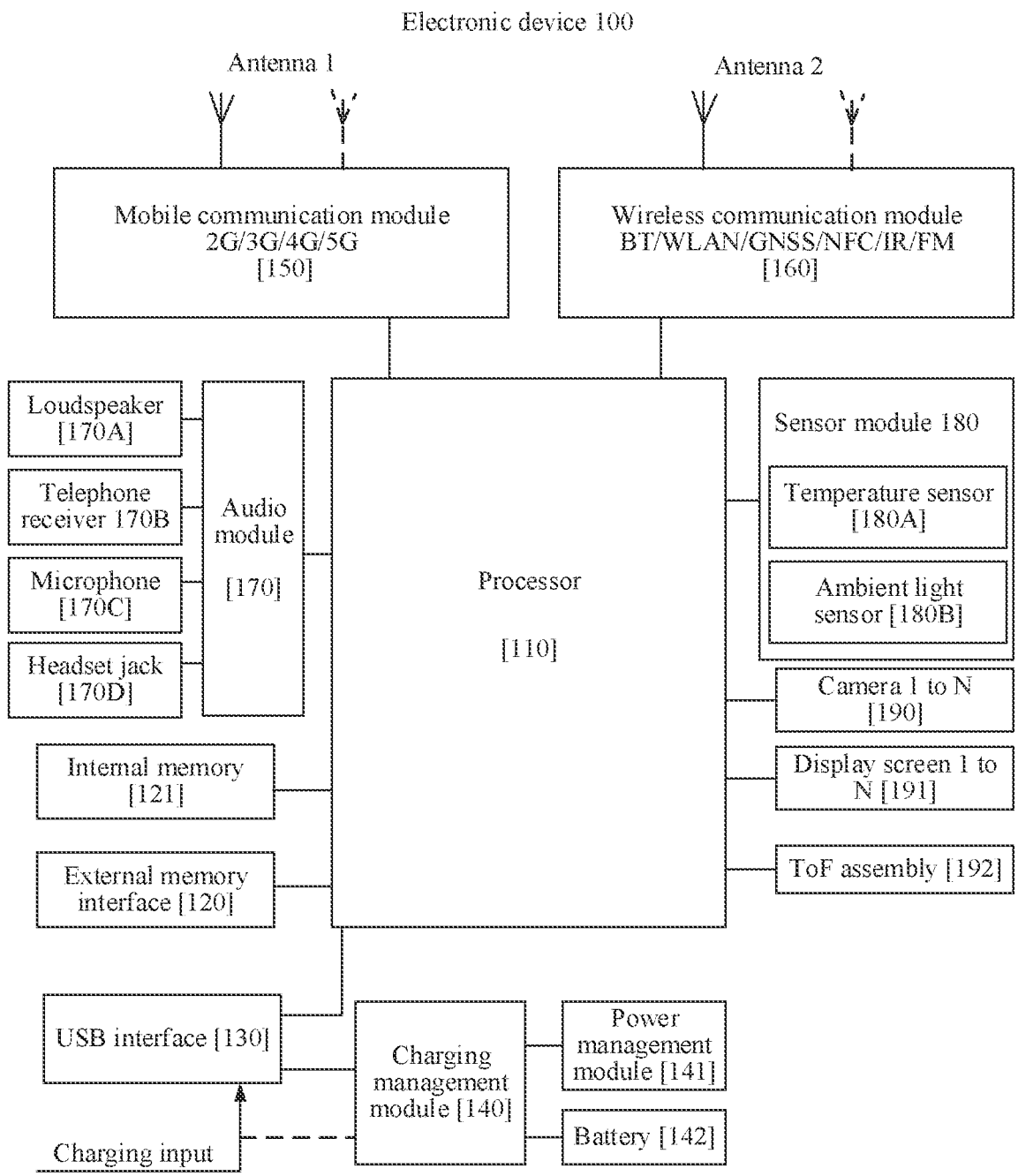
FIG. 3 is a schematic diagram of a hardware structure of an electronic device to which a method for eliminating an interference pattern in an image is applicable according to an embodiment of this application.

FIG. 3 is a schematic structural diagram of an electronic device 100 according to an embodiment of this application. As shown in FIG. 3, the electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a telephone receiver 170B, a microphone 170C, a headset jack 170D, a sensor module 180, a camera 190, a display screen 191, and a ToF assembly 192. The sensor module 180 may include a temperature sensor 180A, an ambient light sensor 180B, and the like.

It may be understood that the structure shown in this embodiment of the present invention does not constitute a specific limitation on the electronic device 100. In some other embodiments of this application, the electronic device 100 may include more or fewer components than those shown in the figure, or some components may be combined, or some components may be split, or components are arranged in different manners. The components in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU), and the like. Different processing units may be independent devices, or may be integrated into one or more processors.

The controller may be a nerve center and a command center of the electronic device 100. The controller may generate an operation control signal based on an instruction operation code and a timing signal, and read an instruction and control execution of the instruction.

A memory may be further configured in the processor 110, to store an instruction and data. In some embodiments, the memory in the processor 110 is a cache memory. The memory may store an instruction or data that is recently used or cyclically used by the processor 110. If the processor 110 needs to use the instruction or the data again, the processor 110 may directly invoke the instruction or the data from the memory, to avoid repeated access and reduce a waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, and/or a universal serial bus (universal serial bus, USB) interface, and the like.

The I2C interface is a two-way synchronization serial bus, and includes a serial data line (serial data line, SDA) and a serial clock line (derail clock line, SCL). In some embodiments, the processor 110 may include a plurality of groups of I2C buses. The processor 110 may be respectively coupled to a charger, a flash light, the camera 190, and the like by using different I2C bus interfaces.

The I2S interface may be used for audio communication. In some embodiments, the processor 110 may include a plurality of groups of I2S buses. The processor 110 may be coupled to the audio module 170 by using the I2S bus, to implement communication between the processor 110 and the audio module 170. In some embodiments, the audio module 170 may transfer an audio signal to the wireless communication module 160 by using the I2S interface, to implement a function of answering a call by using a Bluetooth headset.

The PCM interface may further be configured to perform audio communication, to sample, quantize, and encode an analog signal. In some embodiments, the audio module 170 may be coupled to the wireless communication module 160 by using the PCM bus interface. In some embodiments, the audio module 170 may alternatively transfer an audio signal to the wireless communication module 160 by using the PCM interface, to implement the function of answering a call by using a Bluetooth headset. Both the I2S interface and the PCM interface may be used for audio communication.

The UART interface is a universal serial data bus, and is used for asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 by using a UART interface, to implement a Bluetooth function. In some embodiments, the audio module 170 may transfer an audio signal to the wireless communication module 160 by using a UART interface, to implement a function of playing music by using a Bluetooth headset.

The MIPI interface may be configured to connect the processor 110 to a peripheral device such as the display screen 191 and the camera 190. The MIPI interface includes a camera serial interface (camera serial interface, CSI), a display serial interface (display serial interface, DSI), and the like. In some embodiments, the processor 110 communicates with the camera 190 by using the CSI interface, to implement a photographing function of the electronic device 100. The processor 110 communicates with the display screen 191 by using a DSI interface, to implement a display function of the electronic device 100.

The GPIO interface may be configured by using software. The GPIO interface may be configured to transmit a control signal, or may be configured to transmit a data signal. In some embodiments, the GPIO interface may be configured to connect the processor 110 to the camera 190, the display screen 191, the wireless communication module 160, the audio module 170, the sensor module 180, and the like. The GPIO interface may alternatively be configured as an I2C interface, an I2S interface, a UART interface, a MIPI interface, or the like.

The USB interface 130 is an interface that conforms to a USB standard specification, and may be specifically a mini USB interface, a micro USB interface, a USB Type C interface, or the like. The USB interface 130 may be configured to connect to the charger to charge the electronic device 100, or may be used for data transmission between the electronic device 100 and a peripheral device, or may be configured to connect to a headset, to play audio by using the headset. The interface may alternatively be configured to connect to another electronic device such as an AR device.

It may be understood that an interface connection relationship between the modules illustrated in this embodiment of the present invention is merely an example for description, and does not constitute a limitation on a structure of the electronic device 100. In some other embodiments of this application, the electronic device 100 may alternatively use an interface connection manner different from that in the foregoing embodiment, or use a combination of a plurality of the interface connection manners.

The charging management module 140 is configured to receive charging input from a charger. The charger may be a wireless charger, or may be a wired charger. In some embodiments of wired charging, the charging management module 140 may receive charging input of a wired charger by using the USB interface 130. In some embodiments of wireless charging, the charging management module 140 may receive wireless charging input by using a wireless charging coil of the electronic device 100. The charging management module 140 may supply power for the electronic device by using the power management module 141 while charging the battery 142.

The power management module 141 is configured to be connected to the battery 142, the charging management module 140, and the processor 110. The power management module 141 receives an input of the battery 142 and/or the charging management module 140, to supply power to the processor 110, the internal memory 121, an external memory, the display screen 191, the camera 190, the wireless communication module 160, and the like. The power management module 141 may further be configured to monitor parameters such as a battery capacity, a battery cycle count, and a battery health status (power leakage and impedance). In some other embodiments, the power management module 141 may alternatively be configured in the processor 110. In some other embodiments, the power management module 141 and the charging management module 140 may further be configured in a same device.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna of the electronic device 100 may be configured to cover one or more communication frequency bands. Different antennas may also be multiplexed to improve utilization of the antennas. For example, the antenna 1 may be multiplexed as a diversity antenna of a wireless local area network. In some embodiments, the antenna may be used in combination with a tuning switch.

The mobile communications module 150 may provide a solution to wireless communication such as 2G/3G/4G/5G applied to the electronic device 100. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering and amplification on the received electromagnetic wave, and transmit the processed electromagnetic wave to the modem processor for demodulation. The mobile communication module 150 may further amplify a signal modulated by the modem processor, and convert the signal into an electromagnetic wave for radiation through the antenna 1. In some embodiments, at least some function modules of the mobile communication module 150 may be disposed in the processor 110. In some embodiments, at least some functional modules of the mobile communication module 150 may be configured in a same device as at least some modules of the processor 110.

The modem processor may include a modulator and a demodulator. The modulator is configured to modulate a to-be-sent low-frequency baseband signal into a medium-high-frequency signal. The demodulator is configured to demodulate the received electromagnetic wave signal into a low-frequency baseband signal. Then, the demodulator transmits the demodulated low-frequency baseband signal to the baseband processor for processing. The low-frequency baseband signal is processed by the baseband processor and then transmitted to an application processor. The application processor outputs a sound signal by using an audio device (which is not limited to the speaker 170A, the telephone receiver 170B, and the like), or displays an image or a video by using the display screen 191. In some embodiments, the modem processor may be an independent component. In some other embodiments, the modem processor may be independent of the processor 110, and is configured in a same device as the mobile communications module 150 or another function module.

The wireless communications module 160 may provide a solution to wireless communication applied to the electronic device 100, for example, a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), a near field communication (near field communication, NFC) technology, an infrared (infrared, IR) technology, and the like. The wireless communication module 160 may be one or more devices that integrate at least one communication processing module. The wireless communication module 160 receives an electromagnetic wave by using the antenna 2, performs frequency modulation and filtering processing on an electromagnetic wave signal, and sends a processed signal to the processor 110. The wireless communication module 160 may alternatively receive a to-be-sent signal from the processor 110, perform frequency modulation and amplification on the to-be-sent signal, and convert the signal into an electromagnetic wave for radiation by using the antenna 2.

In some embodiments, in the electronic device 100, the antenna 1 is coupled to the mobile communication module 150, and the antenna 2 is coupled to the wireless communication module 160, so that the electronic device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, a WLAN, NFC, FM, an IR technology, and/or the like. The GNSS may include a global positioning system (global positioning system, GPS), a global navigation satellite system (global navigation satellite system, GLONASS), and a Beidou navigation satellite system (beidou navigation satellite system, BDS), a quasi-zenith satellite system (quasi-zenith satellite system, QZSS) and/or a satellite based augmentation system (satellite based augmentation system, SBAS).

The electronic device 100 implements a display function by using the GPU, the display screen 191, the application processor, and the like. The GPU is a microprocessor for image processing, and is connected to the display screen 191 and the application processor. The GPU is configured to perform mathematical and geometric calculations and perform graphics rendering. The processor 110 may include one or more GPUs and execute program instructions to generate or change display information.

The display screen 191 is configured to display an image, a video, or the like. The display screen 191 may also be referred to as the screen 191. The display screen 191 includes a display panel. The display panel may use a liquid crystal display (liquid crystal display, LCD), an organic light-emitting diode (organic light-emitting diode, OLED), an active-matrix organic light emitting diode or an active-matrix organic light emitting diode (active-matrix organic light emitting diode, AMOLED), a flexible light-emitting diode (flex light-emitting diode, FLED), a mini-LED, a micro-LED, a micro-OLED, a quantum dot light emitting diode (quantum dot light emitting diodes, QLED), or the like. In some embodiments, the electronic device 100 may include 1 or N display screens 191. N is a positive integer greater than 1.

The electronic device 100 can implement a photographing function by using the ISP, the camera 190, the video codec, the GPU, the display screen 191, the application processor, and the like.

The camera 190 is configured to capture a static image or a video. An optical image of an object is generated through a lens and is projected to a photosensitive element. The photosensitive element may be a charge-coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert it to a digital image signal. The ISP outputs the digital image signal to the DSP for processing. The DSP converts the digital image signal into a standard image signal in an RGB format, a YUV format, or the like. In some embodiments, the electronic device 100 may include 1 or N cameras 190, and N is a positive integer greater than 1.

The ISP is configured to process data fed back by the camera 190. For example, during photo taking, a shutter is opened, a ray of light is transmitted to a light-sensitive element of the camera through a lens, an optical signal is converted into an electrical signal, and the light-sensitive element of the camera transmits the electrical signal to the ISP for processing, and the ISP converts the electrical signal into an image that can be seen. The ISP may also perform algorithm optimization on noise points, brightness, and skin tone of the image. The ISP may also optimize parameters such as exposure and a color temperature of a photographed scene. In some embodiments, the ISP may be disposed in the camera 190.

The digital signal processor is configured to process a digital signal, and may further process another digital signal in addition to a digital image signal. For example, when the electronic device 100 performs frequency selection, the DSP is configured to perform Fourier transform and the like on frequency energy.

The video codec is configured to compress or decompress a digital video. The electronic device 100 may support one or more video codecs. In this way, the electronic device 100 may play or record videos in a plurality of encoding formats, for example, moving picture experts group (moving picture experts group, MPEG) 1, MPEG 2, MPEG 3, and MPEG 4.

The NPU is a neural-network (neural-network, NN) computing processor, quickly processes input information by referring to a structure of a biological neural network, for example, a transmission mode between neurons in a human brain, and may further continuously perform self-learning. The NPU may be used to implement an application such as intelligent cognition of the electronic device 100, for example, image recognition, facial recognition, voice recognition, and text understanding.

The external memory interface 120 may be configured to connect to an external storage card, for example, a micro SD card, to expand a storage capability of the electronic device 100. The external storage card communicates with the processor 110 by using the external memory interface 120, so as to implement a data storage function, such as storing a file such as music or a video in the external storage card.

The internal memory 121 may be configured to store computer executable program code, and the executable program code includes instructions. The processor 110 runs the instructions stored in the internal memory 121, to implement various functional applications and data processing of the electronic device 100. The internal memory 121 may include a program storage region and a data storage region. The program storage region may store an operating system, an application program required by at least one function (such as a voice playing function or an image playing function), and the like. The data storage region may store data (such as audio data and an address book) and the like created when the electronic device 100 is used. In addition, the internal memory 121 may include a high-speed random access memory, and may also include a non-volatile memory, for example, at least one magnetic disk storage device, a flash memory device, or a universal flash storage (universal flash storage, UFS).

The electronic device 100 may implement an audio function such as music playback or recording by using the audio module 170, the speaker 170A, the telephone receiver 170B, the microphone 170C, the headset jack 170D, the application processor, and the like The audio module 170 is configured to convert digital audio information into an analog audio signal output, and is further configured to convert an analog audio input into a digital audio signal. The audio module 170 may be further configured to encode and decode an audio signal. In some embodiments, the audio module 170 may be disposed in the processor 110, or some function modules of the audio module 170 are disposed in the processor 110.

The speaker 170A, also referred to as a "horn", is configured to convert an audio electrical signal into a sound signal. Music can be listened to or a hands-free call can be answered by using the speaker 170A in the electronic device 100.

The telephone receiver 170B, also referred to as a "receiver", is configured to convert an audio electrical signal into a sound signal. When the electronic device 100 is used to answer a call or receive voice information, the telephone receiver 170B may be put close to a human ear, to receive the voice information.

The microphone 170C, also referred to as a "microphone" or a "microphone", is configured to convert a sound signal into an electrical signal. When making a call or sending voice information, a user may make a sound near the microphone 170C through the mouth of the user, to input a sound signal into the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may be alternatively disposed in the electronic device 100, to collect a sound signal, implement noise reduction, recognize a sound source, implement a directional recording function, and the like.

The headset jack 170D is configured to connect to a wired headset. The headset jack 170D may be a USB interface 130, or may be a 3.5 mm open mobile terminal platform (open mobile terminal platform, OMTP) standard interface, or cellular telecommunications industry association of the USA (cellular telecommunications industry association of the USA, CTIA) standard interface.

The ToF assembly 192 is configured to measure a time it takes for a light pulse to fly to the to-be-measured object and then return back to the ToF assembly, or to measure a phase difference, to obtain distance and depth data of the to-be-measured object, thereby obtaining a three-dimensional model of the to-be-measured object. In this embodiment of this application, the ToF assembly 192 is arranged under a display screen (a screen). In some other examples, the ToF assembly may also be referred to as a ToF sensor, a ToF camera, or the like.

The temperature sensor 180A is configured to detect a temperature. The electronic device 100 may execute a temperature processing policy by using the temperature detected by the temperature sensor 180A. For example, when the temperature reported by the temperature sensor 180A exceeds a threshold, the electronic device 100 lowers performance of a processor located near the temperature sensor 180A, to reduce power consumption and implement thermal protection. For example, when the temperature is lower than another threshold, the electronic device 100 heats the battery 142, to avoid an abnormal shutdown of the electronic device 100 caused by a low temperature. For another example, when the temperature is lower than still another threshold, the electronic device 100 boosts an output voltage of the battery 142 to prevent the abnormal shutdown caused by the low temperature. In some embodiments, the temperature sensor 180A may be arranged beside or inside the ToF assembly 192, to detect a temperature of the ToF assembly 192 or a temperature of an assembly (such as an emitting unit) inside the ToF assembly 192.

The ambient light sensor 180B is configured to perceive ambient light intensity. For example, the electronic device 100 may adaptively adjust intensity of the display screen 191 according to the perceived ambient light intensity. For example, the ambient light sensor 180B may also be configured to automatically adjust white balance during photographing. For another example, the ambient light sensor 180B may also cooperate with the optical proximity sensor to detect whether the electronic device 100 is in a pocket to prevent a false touch. For another example, the electronic device 100 may adjust an exposure time of the ToF assembly 192 according to the perceived ambient light intensity.

Figure 4A:
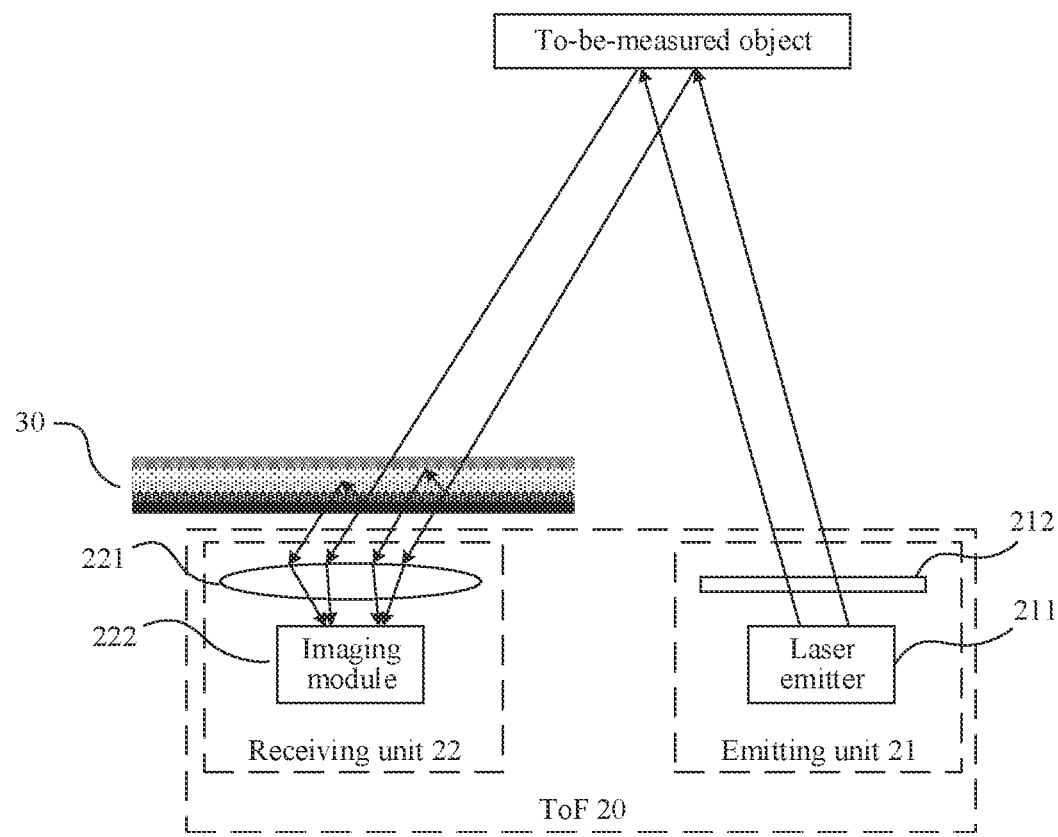
FIG. 4A is a schematic diagram of a principle based on which a ToF under a screen generates an interference pattern.
Figure 4B:
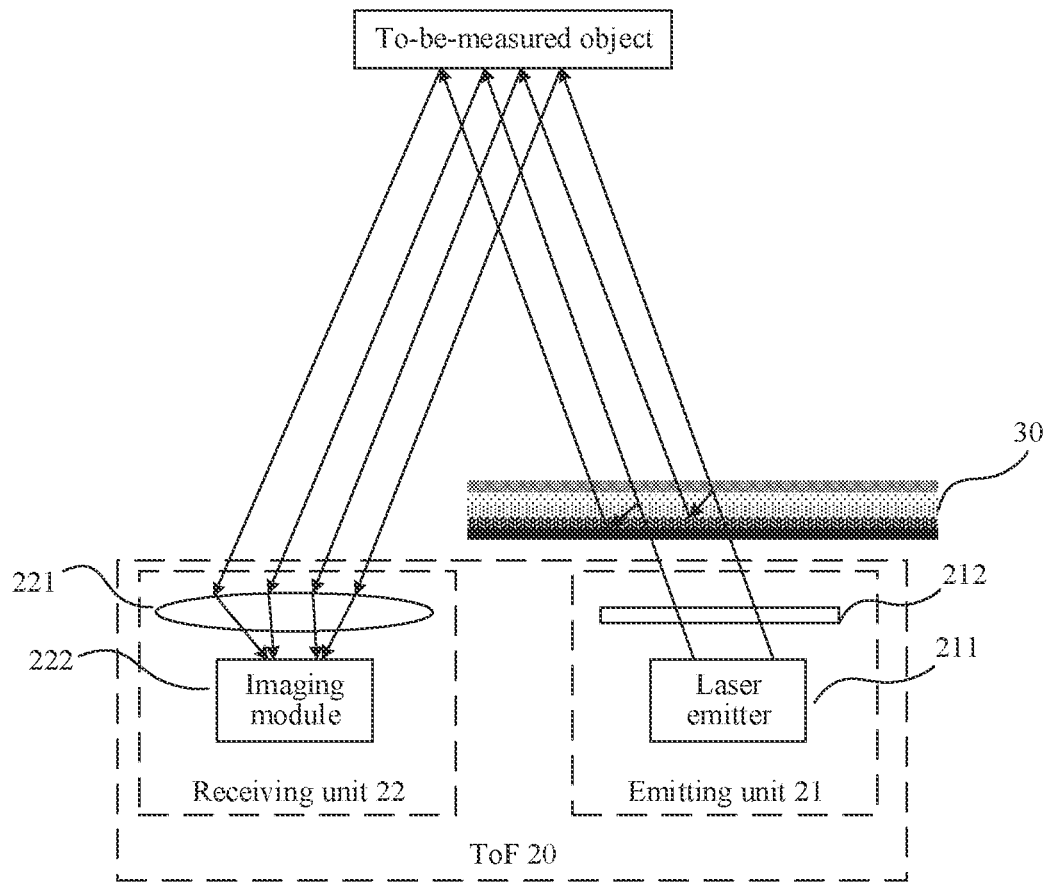
FIG. 4B is a schematic diagram of a principle based on which a ToF under a screen generates an interference pattern.

In an example, as shown in FIG. 4A and FIG. 4B, a ToF 20 includes an emitting unit 21 and a receiving unit 22. The emitting unit 21 includes a laser emitter 211 configured to emit a laser pulse. For example, the laser emitter 211 may be a laser diode, a vertical-cavity surface-emitter laser (vertical-cavity surface-emitter laser, VCSEL), an edge emitting laser (edge emitting laser, EEL), or the like. Optionally, the emitting unit 21 further includes a diffusion sheet 212, configured to convert laser emitted by the laser emitter 211 into parallel laser beams. The receiving unit 22 includes a lens 221 and an imaging module 222. The lens 221 is an optical lens, configured to converge received laser and converge the received laser to the imaging module 222. The imaging module 222 may be an imaging sensor including two or more shutters for sampling reflected laser beams at different moments. For example, the imaging module 222 may be a CMOS. The ToF 20 may further include a calculation unit (not shown in the figure), which is configured to calculate a distance between the to-be-measured object and the ToF according to a time difference or a phase difference between laser received by the receiving unit 22 and laser emitted by the emitting unit 21, to obtain a depth map of the to-be-measured object. The depth map is usually a grayscale image, and each value therein represents a distance between a pixel of the to-be-measured object and the ToF.

The screen of the electronic device usually includes a multi-layer structure and there are refractive index differences between layers. In a case that the ToF is located under the screen, the laser, when passing through screen layers, may be reflected between different layers of the screen for many times to form equal inclination interference, thereby forming an interference pattern.

In an example, FIG. 4A is a schematic diagram of a formation principle of an interference pattern in a case that the receiving unit of the ToF is located under the screen. As shown in FIG. 4A, the receiving unit 22 of the ToF 20 is located under a screen 30, and a laser beam emitted by the laser emitter 211 is first incident into the screen 30 after being reflected by a to-be-measured object. A part of the laser beam directly passes through the screen 30 and enters the imaging module 222 of the receiving unit 22, and the other part of incident laser beam is reflected back to a structure of a previous layer and then incident into the imaging module 222 of the receiving unit 22 again. That is, there is a phase difference (a time difference) between the two parts of the laser beam incident into the imaging module 222. In this way, the laser beam is reflected between different layers of the screen for many times to form the interference pattern.

In another example, FIG. 4B is a schematic diagram of a formation principle of an interference pattern in a case that the emitting unit of the ToF is located under the screen. As shown in FIG. 4B, the emitting unit 21 of the ToF 20 is located under the screen 30. A laser beam emitted by the laser emitter 211 is incident into the screen 30. A part of the laser beam directly passes through the screen 30 and reaches the to-be-measured object, and the other part of the laser beam reaches the to-be-measured object after being reflected in the screen 30 for one or more times. The two parts of the laser beam, where one part directly passes through the screen 30 and the other part is emitted after being reflected inside the screen 30, is incident into the imaging module 222 of the receiving unit 22 after being reflected by the to-be-measured object. There is a phase difference (time difference) between the two parts of the laser beam received by the imaging module 222. In this way, the laser beam is reflected between different layers of the screen for many times to form the interference pattern.

In another example, both the emitting unit and the receiving unit are located under the screen. An interference pattern formed in a case that a laser beam is reflected between different layers of the screen for many times is formed by superimposing the interference patterns formed in the foregoing two cases. Exemplarily, the interference pattern formed in a case that the laser beam is reflected between different layers of the screen for many times is shown in FIG. 2B. The interference pattern is a bright-dark concentric ring.

A three-dimensional image collected by the ToF under the screen includes the interference pattern, which affects collection of information about the three-dimensional image. In a case that the interference pattern in the three-dimensional image can be accurately determined, the interference pattern can be eliminated from the three-dimensional image.

Referring to FIG. 4A and FIG. 4B, the interference pattern is formed in a case that laser is reflected between different layers of the screen when passing through the screen, and is related to a laser light source and a structure of the screen. In an example, such an interference phenomenon may be described by using an interference formula $2nh \cos \theta = m\lambda$, where n is a refractive index of a screen layer in which refraction occurs, h is a thickness of the screen layer in which refraction occurs, $\theta$ is an angle between a laser beam and a normal line of the screen, m is an interference order, and $\lambda$ is a wavelength of the laser. It should be noted that the interference phenomenon that occurs every time the laser is refracted between the screen layers satisfies the foregoing interference formula, and parameters in the interference formula are parameters of a screen layer in which refraction occurs. In a case that the laser is refracted between the screen layers for many times, the interference pattern generated on the ToF under the screen is generated through superimposition of a plurality of interference phenomena.

Figure 5A:
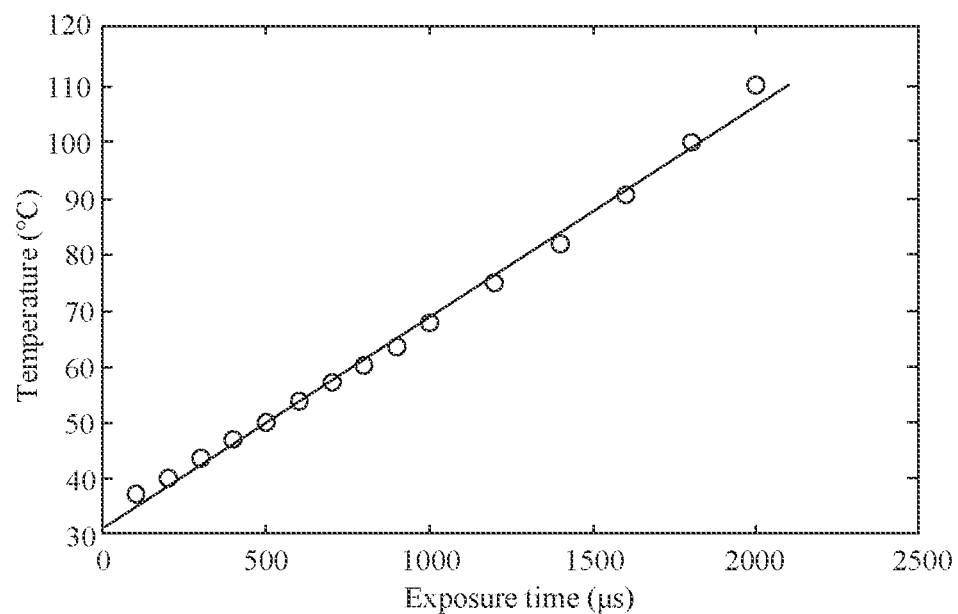
FIG. 5A is a schematic diagram of a principle of a method for eliminating an interference pattern in an image according to an embodiment of this application.
Figure 5B:
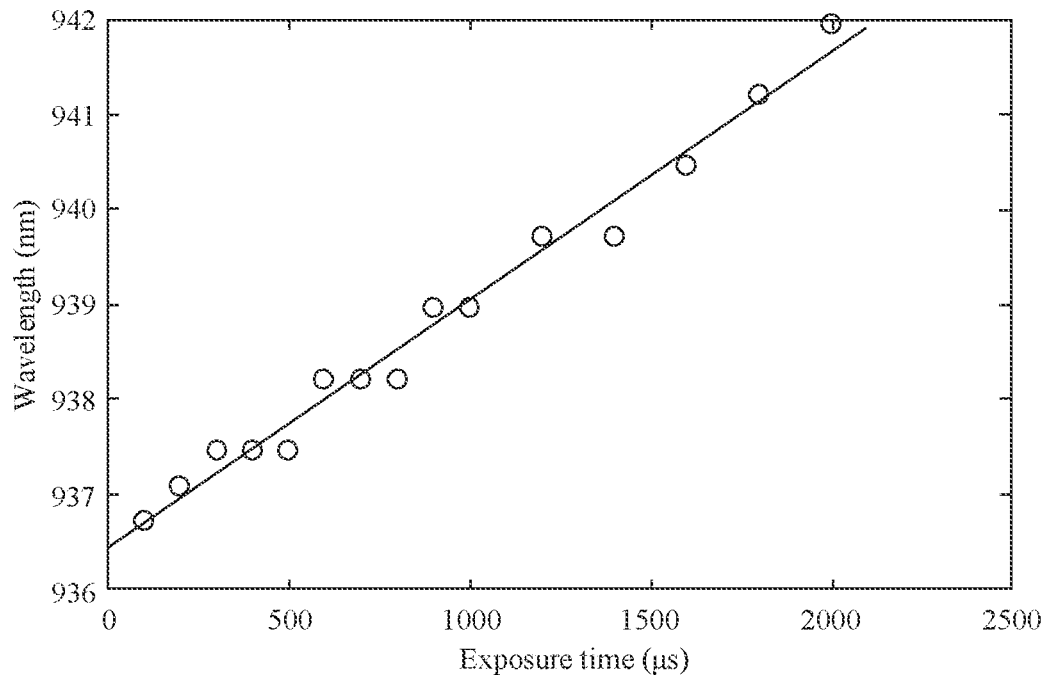
FIG. 5B is a schematic diagram of a principle of a method for eliminating an interference pattern in an image according to an embodiment of this application.

For the ToF, $\lambda$ changes dynamically. This is because, in a case that the ToF collects an image, the exposure time (that is, a quantity of exposure frames) is dynamically adjusted with brightness of surrounding light. In a case that the surrounding light is bright, the exposure time is short, and in a case that the surrounding light is dark, the exposure time is long. A temperature of the laser emitter changes with the change of the exposure time. The change of the temperature of the laser emitter causes a change in the wavelength $\lambda$ of the emitted laser. For example, in a case that ambient light is dark (the ambient light intensity is weak), the exposure time of the ToF is long, and the temperature of the laser emitter rises, causing the wavelength $\lambda$ of the laser to be lengthened. In a case that the ambient light is bright (the ambient light intensity is strong), the exposure time of the ToF is short, and the temperature of the laser emitter decreases, causing the wavelength λ of the laser to be shortened correspondingly. Exemplarily, FIG. 5A is a schematic diagram of a relationship between a temperature of a VCSEL and the exposure time. As shown in FIG. 5A, as the exposure time increases, the temperature of the VCSEL generally rises linearly. Exemplarily, FIG. 5B is a schematic diagram of a relationship between a center wavelength of laser emitted by the VCSEL and the exposure time. As shown in FIG. 5B, as the exposure time increases, the wavelength of the laser generally increases linearly. With reference to FIG. 5A and FIG. 5B, the temperature of the VCSEL rises from 37° C. to 109° C., and the wavelength increases from 936.7 nm to 942 nm.

For the ToF under the screen, values of n, h, and θ are determined, λ changes dynamically, and the interference order m changes dynamically with λ. Therefore, the interference pattern changes dynamically with λ. In an example, a relationship between the wavelength λ of the laser and the interference pattern is shown in a formula 1.

$$r = \sqrt{\left(\frac{2nhf}{m\lambda}\right)^2 - f^2} \quad \text{Formula 1}$$

r is a radius of a circular ring in the interference pattern, n is a refractive index of a screen layer in which refraction occurs, h is a thickness of the screen layer in which refraction occurs, m is an interference order, λ is a wavelength of laser, and f is a focal length of a lens of the ToF. It can be seen that in the interference pattern generated in a case that the laser beam is refracted in the screen for one time, the radius r of the circular ring changes with the change of the wavelength λ of the laser.

Figure 6A:
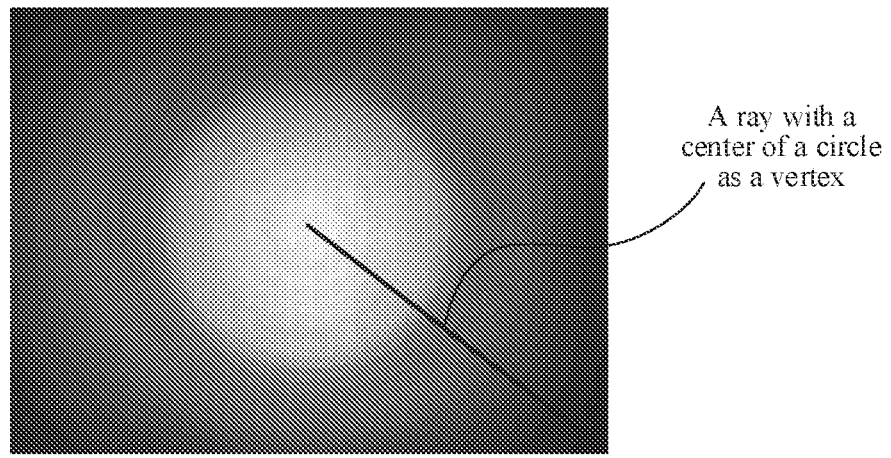
FIG. 6A is a schematic diagram of a principle of a method for eliminating an interference pattern in an image according to an embodiment of this application.
Figure 6B:
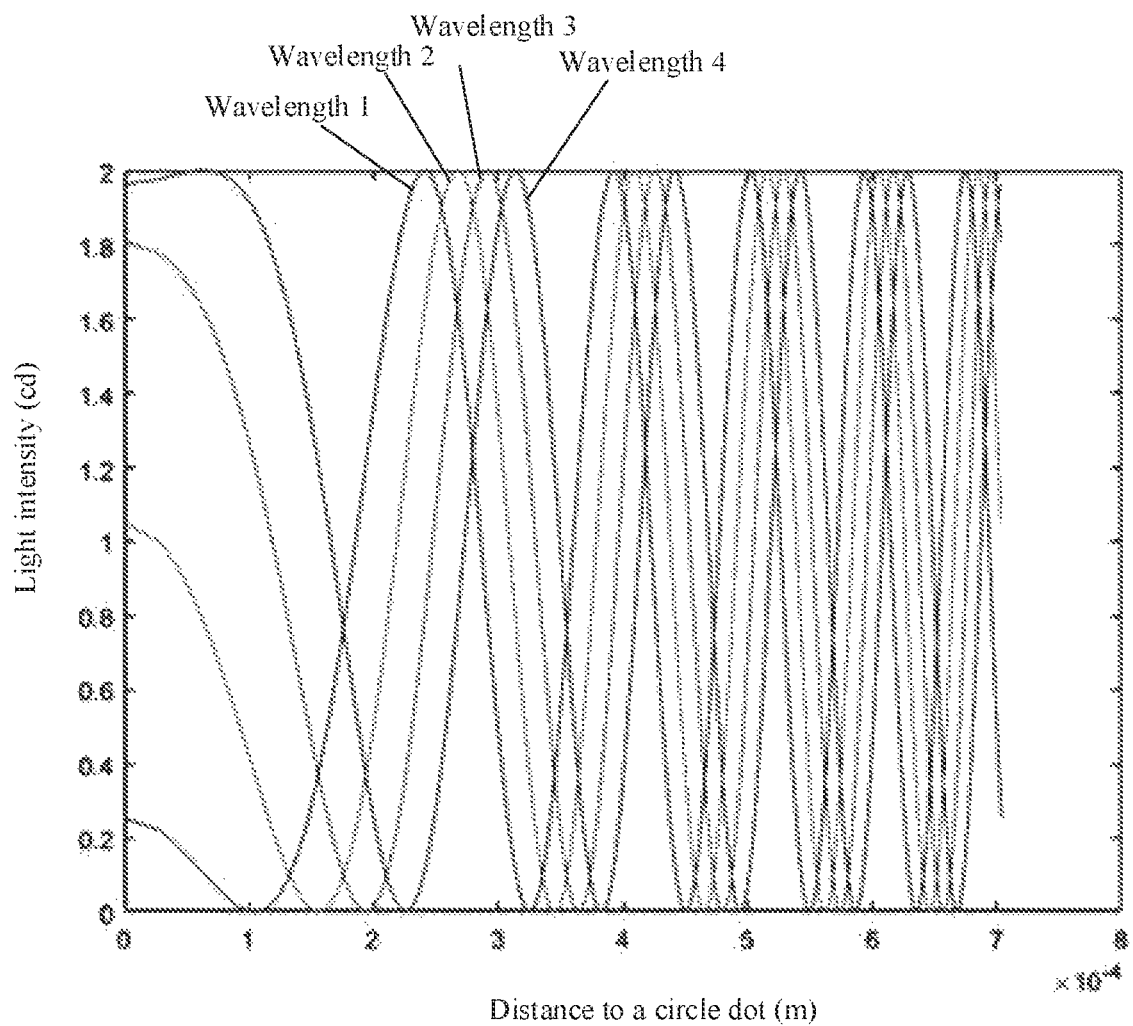
FIG. 6B is a schematic diagram of a principle of a method for eliminating an interference pattern in an image according to an embodiment of this application.

As shown in FIG. 6A, a cross section of an interference pattern is obtained along a ray drawn starting from a center of the concentric ring in the interference pattern. FIG. 6B is a schematic diagram in which an interference pattern changes with the change of the wavelength of the laser on a cross section. Exemplarily, FIG. 6B is a schematic diagram in which in a case that four curves in the figure are different wavelengths, at each point of the cross section, light intensity changes with a change in a distance between the point and the center of the concentric ring, where wavelength 1<wavelength 2<wavelength 3<wavelength 4. It can be seen that in a case that the wavelength of the laser changes, interference orders other than a maximum interference order (closet to the center) have a relatively obvious change rule. That is, interference patterns of a same interference order expand nearly linearly as the wavelength increases, and contract nearly linearly as the wavelength decreases.

In an example, a derivative formula in which the interference pattern changes with the wavelength λ of the laser is shown in a formula 2.

$$\frac{dr}{d\lambda} = (4f^2h^2n)/\lambda^2m^2\sqrt{\frac{4f^2h^2n^2}{\lambda^2m^2} - f^2} \quad \text{Formula 2}$$

Figure 6C:
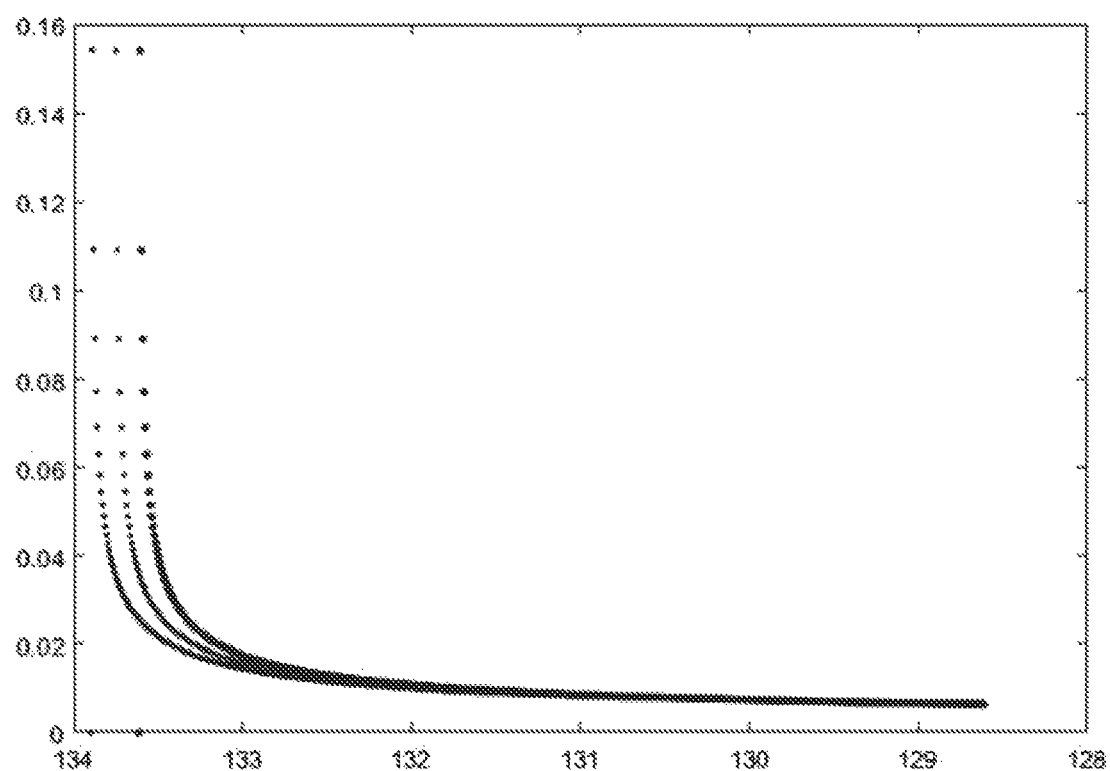
FIG. 6C is a schematic diagram of a principle of a method for eliminating an interference pattern in an image according to an embodiment of this application.

Exemplarily, FIG. 6C is a schematic diagram of a derivative in which the interference pattern changes with the wavelength λ of the laser. It can be seen that for a same interference order, the change of the wavelength of the laser causes interference patterns to change nearly linearly. That is, interference patterns of a same interference order expand nearly linearly as the wavelength increases, and contract nearly linearly as the wavelength decreases.

An embodiment of this application provides a method for eliminating an interference pattern in an image, including: collecting, by a ToF under a screen, an image, where the collected image includes an interference pattern; obtaining the interference pattern in the collected image according to a rule of the interference pattern changing with a wavelength of laser; and eliminating the interference pattern in the collected image. It should be noted that the method for eliminating an interference pattern in an image provided in this embodiment of this application may be implemented by using a ToF assembly, or by using an electronic device including the ToF assembly, or by using another electronic device (such as a server) capable of communicating with the ToF assembly, or the like. This is not limited in this embodiment of this application.

Figure 7:
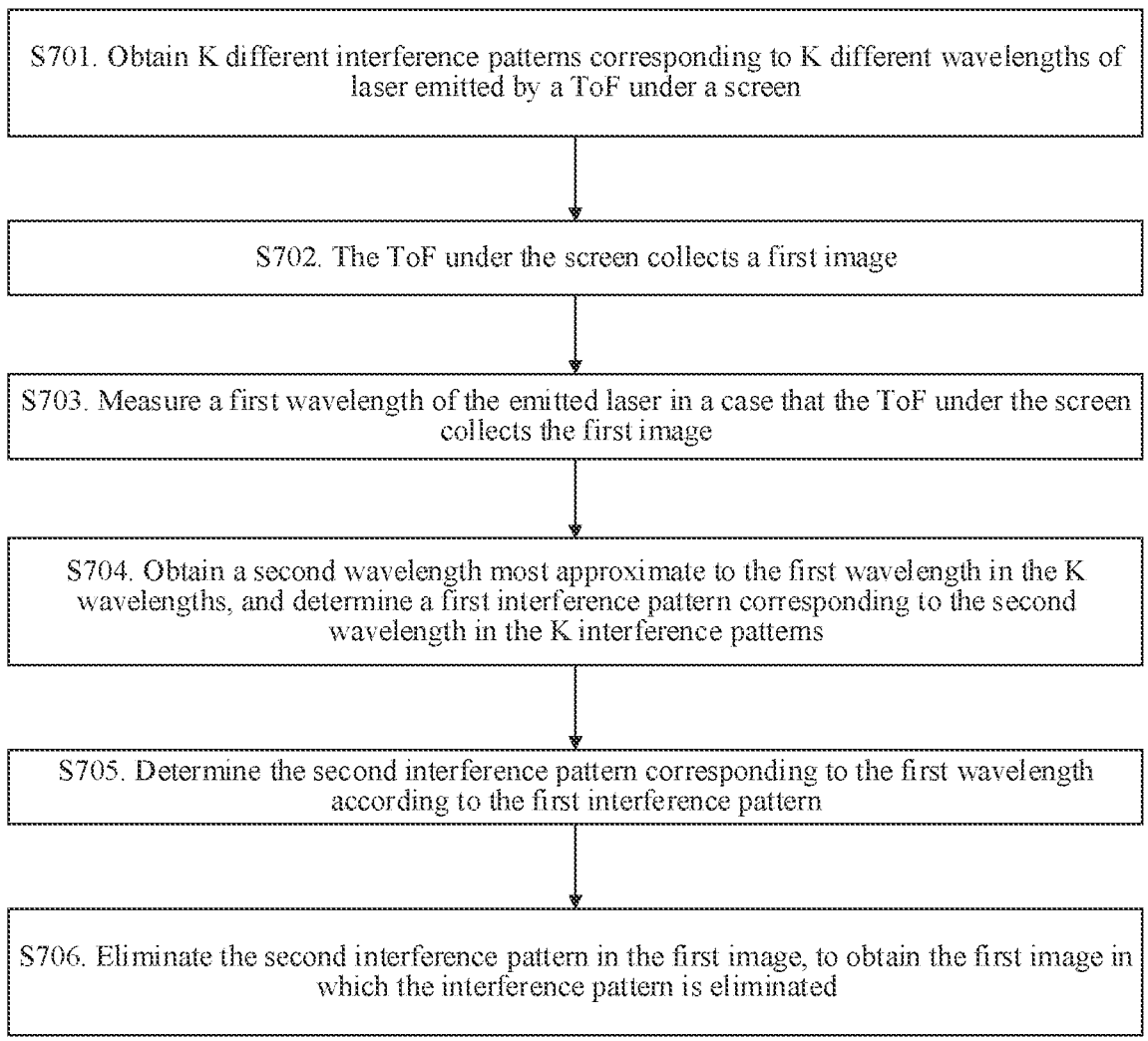
FIG. 7 is a schematic flowchart of a method for eliminating an interference pattern in an image according to an embodiment of this application.

As shown in FIG. 7, the method may include:

S701. Obtain K different interference patterns corresponding to K different wavelengths of laser emitted by a ToF under a screen.

According to the formula 1, in a case that the wavelengths of the laser emitted by the ToF under the screen are different, the interference patterns are different. That is, a radius r of a circular ring of an mth interference order in a bright-dark concentric ring changes with a change of the wavelength λ of the laser. For a same interference order, the longer the wavelength of the laser is, the larger the radius r of the circular ring is; and the shorter the wavelength of the laser is, the smaller the radius r of the circular ring is. K different wavelengths of the laser emitted by the ToF under the screen correspond to K different interference patterns, where K>1. In an example, an interference pattern 1 corresponding a wavelength 936 nm of the laser, an interference pattern 2 corresponding a wavelength 937 nm of the laser, an interference pattern 3 corresponding a wavelength 938 nm of the laser, an interference pattern 4 corresponding a wavelength 938 nm of the laser, an interference pattern 5 corresponding a wavelength 939 nm of the laser, an interference pattern 6 corresponding a wavelength 940 nm of the laser, and an interference pattern 7 corresponding a wavelength 941 nm of the laser are collected. It should be noted that a quantity of collected interference patterns may be increased or reduced as required. For example, in a case that the wavelength of the laser changes from 936 nm to 941 nm, the interference pattern is collected at wavelength intervals of 1 nm. For example, the wavelength intervals at which collection is performed may be reduced (for example, the wavelength interval is 0.2 nm), to improve an elimination effect of the interference pattern in an image. Optionally, the wavelength intervals at which the interference pattern is collected may be uneven. For example, a wavelength of a laser emitter changes from 936 nm to 941 nm, and under common ambient light, a range of the wavelength of the laser emitter is between 936 nm and 939 nm. In this case, between 936 nm and 939 nm, the interference pattern may be collected at the wavelength intervals of 0.2 nm, and between 939 nm and 941 nm, the interference pattern may be collected at the wavelength intervals of 1 mm.

In an implementation, a white plane such as a reflector plate or a flat white wall is used as a to-be-measured object, and an image of the to-be-measured object is collected by using the ToF under the screen to obtain an interference pattern.

S702. The ToF under the screen collects a first image.

The ToF under the screen collects the first image of the to-be-measured object. For example, in a case that the to-be-measured object is a face, the first image is a three-dimensional image of the face. Since the ToF is located under the screen, the first image includes an interference pattern. Exemplarily, the first image is shown in FIG. 2A, and the three-dimensional image of the face includes an interference pattern, that is, a bright-dark concentric ring.

In a case that the ToF under the screen collects an image, an exposure time is automatically adjusted according to ambient light intensity. The longer the exposure time is, the higher a temperature of a laser emitter of the ToF under the screen is, and therefore the longer a wavelength of emitted laser is. In a case that ToF under the screen collects the first image, the ambient light intensity is denoted as first ambient light intensity, which corresponds to a first exposure time, a first temperature of the laser emitter, and a first wavelength of the emitted laser. According to a principle of the formula 1, different wavelength values correspond to different interference patterns, and the first wavelength corresponds to a second interference pattern.

S703. Measure the first wavelength of the emitted laser in a case that the ToF under the screen collects the first image.

It should be noted that an order in which the foregoing S702 and S703 are performed is not limited in this embodiment of this application. The first image may be collected first and then the first wavelength corresponding to the first image is obtained, or the first wavelength may be obtained first and then the first image corresponding to the first wavelength is collected, or S702 and S703 may be performed simultaneously. The order in which S702 and S703 are performed does not affect an implementation effect of this embodiment of this application.

S704. Obtain a second wavelength most approximate to the first wavelength in K wavelengths, and determine a first interference pattern corresponding to the second wavelength in the K interference patterns.

The K interference patterns correspond to the K different wavelengths. Absolute values of differences between the first wavelength and the K wavelengths are compared, and a wavelength (where an absolute value of a difference between the wavelength and the first wavelength is the smallest) most approximate to the first wavelength in the K different wavelengths is the second wavelength. In an example, a difference between the second wavelength and the first wavelength is less than or equal to a first value. Exemplarily, the K wavelengths are respectively 936 nm, 937 nm, 938 nm, 939 nm, 940 nm, and 941 nm. For example, in a case that the first wavelength is 936.7 nm, a difference between 936 nm and 936.7 nm is 0.7 nm, the difference between 937 nm and 936.7 nm is 0.3 nm, a difference between 938 nm and 936.7 nm is 1.3 nm, a difference between 939 nm and 936.7 nm is 2.3 nm, a difference between 940 nm and 936.7 nm is 3.3 nm, and a difference between 941 nm and 936.7 nm is 4.3 nm, where the difference between 937 nm and 936.7 nm is the smallest, and the difference (0.3 nm) is less than the first value, for example, the first value is 0.5 mm. In this case, the second wavelength most approximate to the first wavelength is 937 nm. For example, in a case that the first wavelength is 936.2 nm, a difference between 936 nm and 936.2 mm is the smallest, and the difference (0.2 mm) is less than the first value, for example, the first value is 0.5 nm. In this case, the second wavelength most approximate to the first wavelength is 936 nm. In an example, in a case that absolute values of differences between two adjacent wavelengths in the K different wavelengths and the first wavelength are equal, the first wavelength is a mid-value of the two wavelengths in the K different wavelengths, and the second wavelength is the larger one of the two wavelengths. For example, in a case that the first wavelength is 936.5 mm, absolute values of differences between 936 nm and 936.5 nm and between 937 nm and 936.5 nm are both 0.5 mm, and the difference (0.5 nm) is equal to the first value, for example, the first value is 0.5 mm. In this case, it is determined that the second wavelength is 937 nm. An interference pattern corresponding to the second wavelength is the first interference pattern.

S705. Determine the second interference pattern corresponding to the first wavelength according to the first interference pattern.

According to the formula 2, in a case that the first wavelength is greater than the second wavelength, the second interference pattern is obtained after the first interference pattern is enlarged, and in a case that the first wavelength is less than the second wavelength, the second interference pattern is obtained after the first interference pattern is linearly decreased. In an implementation, enlarging or decreasing the first interference pattern is to enlarge or decrease a radius of each circular ring in the first interference pattern. Optionally, in an example, in a case that the first wavelength is equal to the second wavelength, the first interference pattern is the second interference pattern. Optionally, in some embodiments, in a case that an absolute value of a difference between the first wavelength and the second wavelength is less than a preset threshold (such as 0.05 nm), the first interference pattern is determined as the second interference pattern.

In an implementation, an enlarged or a decreased value of the interference pattern is a value of $\frac{dr}{d\lambda}$ calculated according to the formula 2. Exemplarily, an enlarged value or a decreased value (pixel value) of a radius of a circular ring of an $m_i$th interference order in the first interference pattern is $$(4f^2h^2n)/\lambda^2 m_i^2 \sqrt{\frac{4f^2h^2n^2}{\lambda^2 m_i^2} - f^2},$$

where $\lambda$ is a wavelength of laser, f is a focal length of a lens of the ToF, n is a refractive index of a screen layer in which refraction occurs, and h is a thickness of the screen layer in which the refraction occurs.

It may be understood that in a process in which the interference pattern is eliminated by actually using the method for eliminating an interference pattern in an image provided in this embodiment of this application, it may be unknown that in which layer or layers of the screen the refraction occurs. In an implementation, parameters of each screen layer of the screen may be substituted into the formula 2, to calculate the value of $\frac{dr}{d\lambda}$. Then, a calculated value of each $\frac{dr}{d\lambda}$ or a mathematical operation result of the value of each $\frac{dr}{d\lambda}$ is used to eliminate the interference pattern in the image collected by the ToF under the screen, and the enlarged or decreased value of the interference pattern is adjusted according to the elimination effect.

S706. Eliminate the second interference pattern in the first image, to obtain the first image in which the interference pattern is eliminated.

A gain of the first image is calculated according to the second interference pattern, and gain compensation is performed on the first image, to obtain the first image in which the interference pattern is eliminated. In an implementation, by dividing the first image by the second interference pattern, the first image in which the interference pattern is eliminated is obtained.

Based on the foregoing principle, the wavelength of the laser emitted by the ToF under the screen changes with the ambient light intensity. In a case that ambient light is dark (the ambient light intensity is weak), an exposure time of the ToF is long, and a temperature of a laser emitter rises, the wavelength of the laser is lengthened. In a case that the ambient light is bright (the ambient light intensity is strong), the exposure time of the ToF is short, and the temperature of the laser emitter decreases, the wavelength of the laser is shortened. In a case that the wavelength of the laser emitted by the ToF under the screen changes, the radius of each circular ring in the interference pattern changes. According to the method for eliminating an interference pattern in an image provided in this embodiment of this application, K interference patterns corresponding to K different wavelengths are obtained in advance. After the ToF under the screen collects the first image, by comparing a wavelength of laser emitted in a case that the ToF collects the first image with the K different wavelengths, a wavelength that is most approximate to the wavelength of the laser emitted in a case that the ToF collects the first image is found in the K different wavelengths. An interference pattern corresponding to the most approximate wavelength is linearly enlarged or decreased, to obtain the interference pattern in the first image. In this way, the interference pattern in the first image can be eliminated.

It may be understood that each wavelength corresponds to a temperature of the ToF, an exposure time, and ambient light intensity. In some embodiments, the temperature of the ToF may be monitored, to obtain different interference patterns corresponding to different temperatures of the ToF, that is, to obtain different interference patterns corresponding to different wavelengths. In some embodiments, the exposure time for the ToF to collect an image may be monitored, to obtain different interference patterns corresponding to different exposure times, that is, to obtain different interference patterns corresponding to different wavelengths. In some embodiments, the ambient light intensity may be monitored, to obtain different interference patterns corresponding to different ambient light intensity, that is, to obtain different interference patterns corresponding to different wavelengths. Certainly, different interference patterns corresponding to different wavelengths may also be obtained by monitoring another parameter, and this is not limited in this embodiment of this application.

Figure 8:
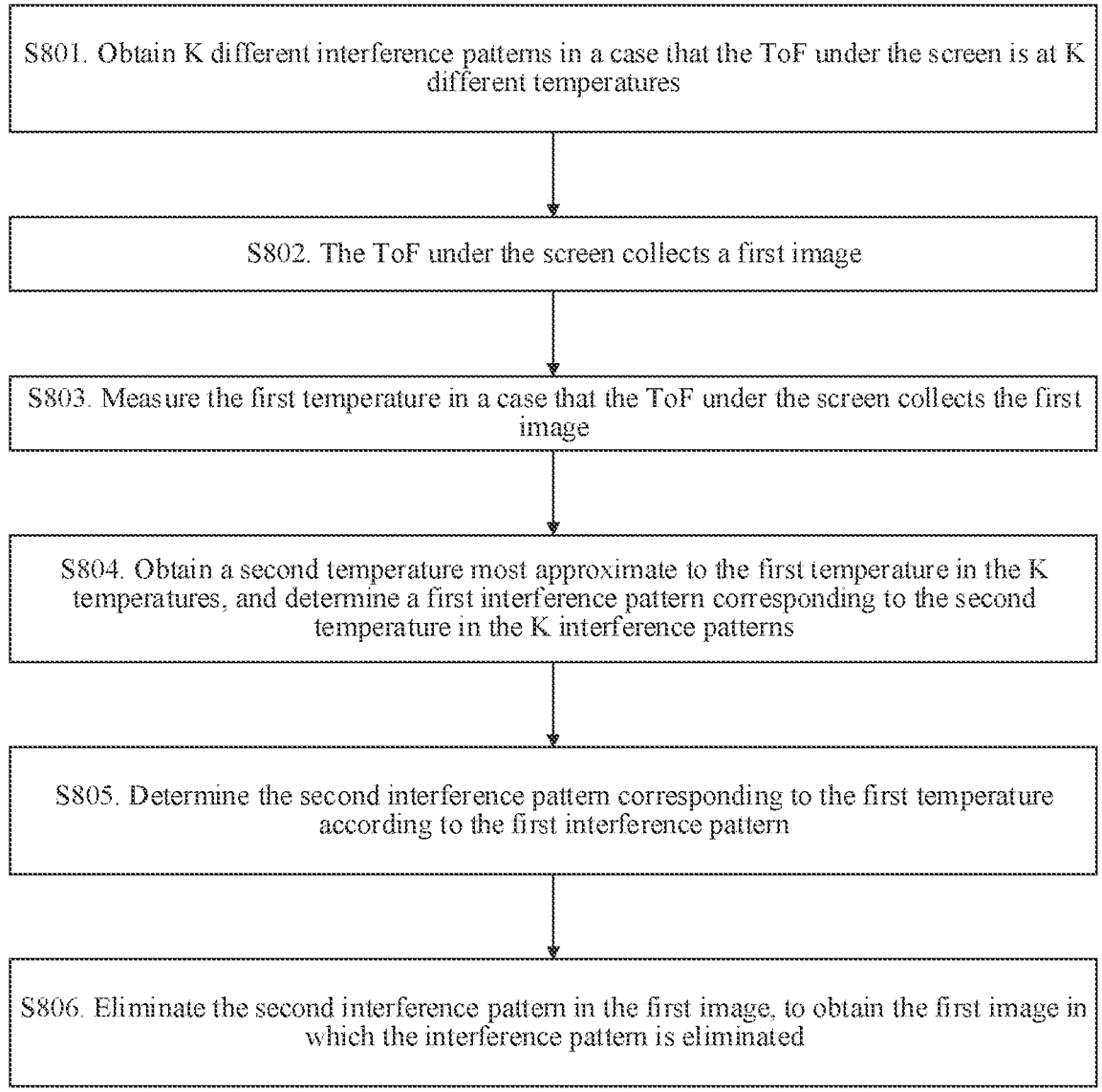
FIG. 8 is a schematic flowchart of a method for eliminating an interference pattern in an image according to an embodiment of this application.

In an example, FIG. 8 is a schematic flowchart of a method for eliminating an interference pattern in an image according to an embodiment of this application. In this method, different interference patterns corresponding to different wavelengths are obtained by monitoring a temperature of a ToF. As shown in FIG. 8, the method may include:

S801. Obtain K different interference patterns in a case that a ToF under a screen is at K different temperatures.

It can be seen from FIG. 5A and FIG. 5B that, as a temperature of a laser emitter of the ToF under the screen increases, the wavelength of laser emitted by the ToF under the screen is lengthened. There is a linear relationship and a one-to-one correspondence between the wavelength of the laser emitted by the ToF under the screen and the temperature of the ToF under the screen. K different interference patterns in a case that the ToF under the screen is at K different temperatures are obtained, that is, K different interference patterns corresponding to K different wavelengths of the laser emitted by the ToF under the screen are obtained.

In an implementation, a temperature sensor is arranged inside or beside the ToF assembly. A temperature of the ToF assembly, that is, the temperature of the laser emitter inside the ToF assembly, is obtained through the temperature sensor. The ToF under the screen collects K interference patterns in a case that the laser emitter is at K different temperatures, where K>1.

In an example, an interference pattern 1 in response to the temperature of the laser emitter being 40° C., an interference pattern 2 in response to the temperature of the laser emitter being 50° C., an interference pattern 3 in response to the temperature of the laser emitter being 60° C., an interference pattern 4 in response to the temperature of the laser emitter being 70° C., an interference pattern 5 in response to the temperature of the laser emitter being 80° C., an interference pattern 6 in response to the temperature of the laser emitter being 90° C., and an interference pattern 7 in response to the temperature of the laser emitter being 100° C. are collected. It should be noted that a quantity of collected interference patterns may be increased or reduced as required. For example, in a case that the temperature of the laser emitter changes from 20° C. to 120° C., interference patterns in response to the temperature of the laser emitter being 20° C. to 120° C. are collected at temperature intervals of 10° C. For example, the temperature interval at which collection is performed may be reduced (for example, the temperature interval is 5° C.), to improve the elimination effect of the interference pattern in the image. Optionally, the temperature intervals at which the interference pattern is collected may be uneven. For example, the temperature of the laser emitter changes from 20° C. to 120° C., and under the common ambient light, a temperature range of the laser emitter is between 40° C. and 80° C. In this case, between 40° C. and 80° C., the interference pattern may be collected at temperature intervals of 5C, and between 20° C. and 40° C., and 80° C. and 120° C., the interference pattern may be collected at temperature intervals of 10° C.

S802. The ToF under the screen collects a first image.

The ToF under the screen collects the first image of a to-be-measured object. For example, in a case that the to-be-measured object is a face, the first image is a three-dimensional image of the face. Since the ToF is located under the screen, the first image includes an interference pattern. Exemplarily, the first image is shown in FIG. 2A, and the three-dimensional image of the face includes an interference pattern, that is, a bright-dark concentric ring.

In a case that the ToF under the screen collects the image, an exposure time is automatically adjusted according to ambient light intensity. The longer the exposure time is, the higher the temperature of the laser emitter of the ToF under the screen is. In a case that the ToF under the screen collects the first image, the laser emitter is at a first temperature correspondingly. The first temperature corresponds to a first wavelength of the emitted laser. According to the principle of the formula 1, different wavelength values correspond to different interference patterns. The first wavelength corresponds to a second interference pattern, that is, the first temperature corresponds to the second interference pattern.

S803. Measure the first temperature in a case that the ToF under the screen collects the first image.

In an implementation, the temperature of the ToF assembly is monitored in real time through the temperature sensor, that is, the temperature of the laser emitter inside the ToF assembly is monitored, to obtain the first temperature in a case that ToF under the screen collects the first image.

It should be noted that an order of performing the foregoing S802 and S803 is not limited in this embodiment of this application. The first image may be collected first and then the first temperature corresponding to the first image is obtained, or the first temperature may be detected first and then the first image corresponding to the first temperature is obtained, or S802 and S803 may be performed simultaneously. The order of performing S802 and S803 does not affect an implementation effect of this embodiment of this application.

S804. Obtain a second temperature most approximate to the first temperature in K temperatures, and determine a first interference pattern corresponding to the second temperature in the K interference patterns.

Absolute values of differences between the first temperature and the K temperatures are compared, to obtain the second temperature most approximate to the first temperature in the K temperatures. In an example, a difference between the second temperature and the first temperature is less than or equal to a first value. Exemplarily, the K temperatures are respectively 40° C., 50° C., 60° C., 70° C., 80° C., 90° C., and 100° C. For example, in a case that the first temperature is 42.6° C., a difference between 40° C. and 42.6° C. is 2.6° C. a difference between 50° C. and 42.6° C. is 7.4° C., a difference between 60° C. and 42.6° C. is 17.4° C., a difference between 70° C. and 42.6° C. is 27.4° C., a difference between 80° C. and 42.6° C. is 37.4° C., a difference between 90° C. and 42.6° C. is 47.4° C., and a difference between 100° C. and 42.6° C. is 57.4° C., where the difference between 40° C. and 42.6° C. is the smallest, and the difference (2.6° C.) is less than the first value, for example, the first value is 5° C. Therefore, the second temperature most approximate to the first temperature is 40° C. For example, in a case that the first temperature is 47.3° C., a difference between 50° C. and 47.3° C. is the smallest, and the difference (2.7° C.) is less than the first value, for example, the first value is 5° C. Therefore, the second temperature most approximate to the first temperature is 50° C. In an implementation, in a case that absolute values of differences between the first temperature and two adjacent temperature values in the K temperatures are equal, one of the two temperature values that is greater than the first temperature is determined as the second temperature. For example, in a case that the first temperature is 45° C., differences between 40° C. and 45° C. and between 50° C. and 45° C. are both 5° C., and the difference (5° C.) is equal to the first value, for example, the first value is 5° C. In this case, it is determined that the second temperature most approximate to the first temperature is 50° C.

The first interference pattern in a case that the ToF under the screen is at the second temperature is obtained. Exemplarily, in a case that the second temperature is 50° C., it is determined that the first interference pattern is the interference pattern 2.

S805. Determine the second interference pattern corresponding to the first temperature according to the first interference pattern.

The first temperature corresponds to the first wavelength, and the second temperature corresponds to a second wavelength. In a case that the first temperature is greater than the second temperature, the first wavelength is greater than the second wavelength. According to the formula 2, in a case that first wavelength is greater than the second wavelength, the second interference pattern is obtained after the first interference pattern is enlarged. In a case that the first temperature is less than the second temperature, the first wavelength is less than the second wavelength. According to the formula 2, in a case that the first wavelength is less than the second wavelength, the second interference pattern is obtained after the first interference pattern is linearly decreased.

In an implementation, an enlarged or a decreased value of the interference pattern is a value of $\frac{dr}{d\lambda}$ calculated according to the formula 2.

Optionally, in a case that the first temperature is equal to the second temperature, the first wavelength is equal to the second wavelength, and in a case that the first wavelength is equal to the second wavelength, the first interference pattern is the second interference pattern.

Optionally, in some embodiments, in a case that an absolute value of a difference between the first temperature and the second temperature is less than a preset threshold (such as 1° C.), the first interference pattern is determined as the second interference pattern.

S806. Eliminate the second interference pattern in the first image, to obtain the first image in which the interference pattern is eliminated.

A gain of the first image is calculated according to the second interference pattern, and gain compensation is performed on the first image, to obtain the first image in which the interference pattern is eliminated. In an implementation, by dividing the first image by the second interference pattern, the first image in which the interference pattern is eliminated is obtained.

Based on the foregoing principle, the temperature of the ToF under the screen changes with the ambient light intensity. In a case that ambient light is dark (the ambient light intensity is weak), an exposure time of the ToF is long, and a temperature of a laser emitter rises, the wavelength of the laser is lengthened. In a case that the ambient light is bright (the ambient light intensity is strong), the exposure time of the ToF is short, and the temperature of the laser emitter decreases, the wavelength of the laser is shortened. In a case that the wavelength of the laser emitted by the ToF under the screen changes, a radius of each circular ring in the interference pattern changes. According to the method for eliminating an interference pattern in an image provided in this embodiment of this application, K interference patterns corresponding to K different temperatures of the ToF are obtained in advance. After the ToF under the screen collects the first image, by comparing a temperature in a case that the ToF collects the first image with the K different temperatures, a temperature that is most approximate to the temperature in a case that the ToF collects the first image is found in the K different temperatures. An interference pattern corresponding to the most approximate temperature is linearly enlarged or decreased, to obtain the interference pattern in the first image. In this way, the interference pattern in the first image can be eliminated.

Figure 9:
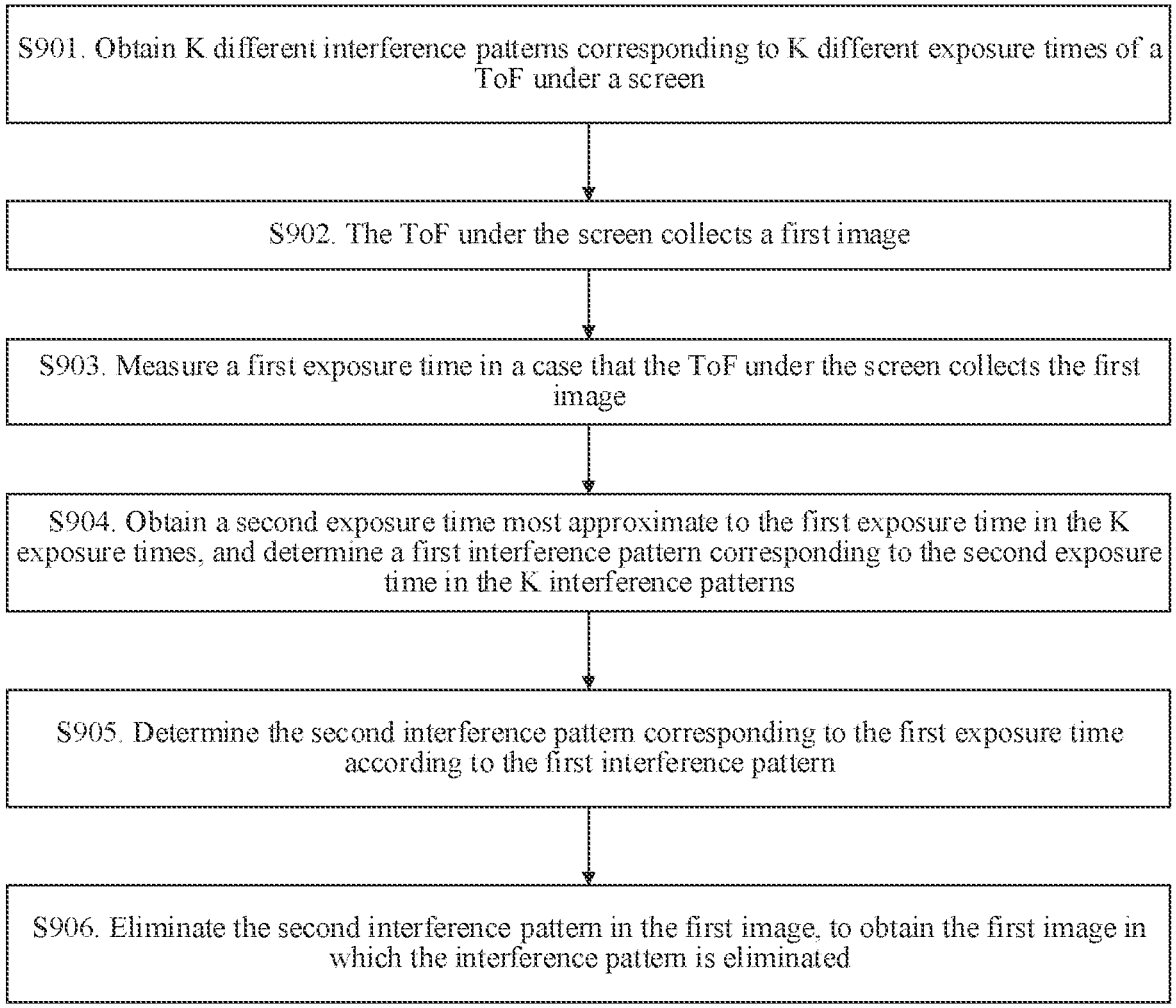
FIG. 9 is a schematic flowchart of a method for eliminating an interference pattern in an image according to an embodiment of this application.

In another example, FIG. 9 is a schematic flowchart of a method for eliminating an interference pattern in an image according to an embodiment of this application. In this method, different interference patterns corresponding to different wavelengths are obtained by monitoring an exposure time for a ToF to collects an image. As shown in FIG. 9, the method may include:

S901. Obtain K different interference patterns corresponding to K different exposure times of a ToF under a screen.

It can be seen from FIG. 5B that the longer the exposure time for the ToF under the screen to collect an image is, the longer a wavelength of laser emitted by the ToF under the screen is. There is a linear relationship and a one-to-one correspondence between the wavelength of the laser emitted by the ToF under the screen and the exposure time for the ToF to collect the image. K different interference patterns corresponding to K different exposure times of the ToF under the screen are obtained, that is, K different interference patterns corresponding to K different wavelengths of the laser emitted by the ToF under the screen are obtained.

An interference pattern 1 corresponding to an exposure time of 0 μs of the ToF, an interference pattern 2 corresponding to an exposure time of 500 μs of the ToF, an interference pattern 3 corresponding to an exposure time of 1000 μs of the ToF, an interference pattern 4 corresponding to an exposure time of 1500 μs of the ToF, an interference pattern 5 corresponding to an exposure time of 2000 μs of the ToF, and an interference pattern 7 corresponding to an exposure time of 2500 μs of the ToF are collected. It should be noted that a quantity of collected interference patterns may be increased or reduced as required. For example, exposure time intervals at which collection is performed may be reduced, to improve the elimination effect of the interference pattern in the image. Optionally, the exposure time intervals at which the interference patterns are collected may be uneven.

S902. The ToF under the screen collects a first image.

The ToF under the screen collects the first image of a to-be-measured object. For example, in a case that the to-be-measured object is a face, the first image is a three-dimensional image of the face. Since the ToF is located under the screen, the first image includes an interference pattern. Exemplarily, the first image is shown in FIG. 2A, and the three-dimensional image of the face includes an interference pattern, that is, a bright-dark concentric ring.

In a case that the ToF under the screen collects the image, the exposure time is automatically adjusted according to ambient light intensity. In a case that the ToF under the screen collects the first image, the ambient light intensity is denoted as first ambient light intensity corresponding to a first exposure time. The first exposure time corresponds to a first temperature of a laser emitter, and corresponds to a first wavelength of the emitted laser. According to the principle of the formula 1, different wavelength values correspond to different interference patterns. The first wavelength corresponds to a second interference pattern, that is, the first exposure time corresponds to the second interference pattern.

S903. Measure the first exposure time in a case that the ToF under the screen collects the first image.

It should be noted that an order of performing the foregoing S902 and S903 is not limited in this embodiment of this application. The first image may be collected first and then the first exposure time corresponding to the first image is obtained, or the first exposure time may be obtained first and then the first image corresponding to the first exposure time is obtained, or S902 and S903 may be performed simultaneously. The order of performing S902 and S903 does not affect an implementation effect of this embodiment of this application.

S904. Obtain a second exposure time most approximate to the first exposure time in the K exposure times, and determine a first interference pattern corresponding to the second exposure time in the K interference patterns.

Absolute values of differences between the first exposure time and the K exposure times are compared, to obtain the second exposure time most approximate to the first exposure time in the K exposure times. In an example, a difference between the second exposure time and the first exposure time is less than or equal to a first value. Exemplarily, the K exposure times are respectively 0 μs, 500 μs, 1000 μs, 1500 μs, 2000 μs, and 2500 μs. For example, in a case that the first exposure time is 520 μs, a difference between 0 μs and 520 μs is 520 μs, a difference between 500 μs and 520 μs is 20 μs, a difference between 1000 μs and 520 μs is 480 μs, a difference between 1500 μs and 520 μs is 980 μs, a difference between 2000 μs and 520 μs is 1480 μs, and a difference between 2500 μs and 520 μs is 1980 μs, where the difference between 500 μs and 520 μs is the smallest, and the difference (20 μs) is less than the first value, for example, the first value is 250 μs. In this case, the second exposure time most approximate to the first exposure time is 500 μs. For example, in a case that the first exposure time is 878 μs, a difference between 1000 μs and 878 μs is the smallest, and the difference (122 μs) is less than the first value. For example, the first value is 250 μs. In this case, the second exposure time most approximate to the first exposure time is 1000 μs. In an implementation, in a case that absolute values of differences between the first exposure time and two adjacent exposure time values in the K exposure times are equal, one of the two exposure time values that is greater than the first exposure time is determined as the second exposure time. For example, in a case that the first exposure time is 750 μs, absolute values of differences between 500 μs and 750 μs and between 1000 μs and 750 μs are both 250 μs, and the difference (250 μs) is equal to the first value, for example, the first value is 250 μs. In this case, the second exposure time most approximate to the first exposure time is 1000 μs.

In the K interference patterns, the first interference pattern corresponding to the second exposure time is determined.

S905. Determine the second interference pattern corresponding to the first exposure time according to the first interference pattern.

The first exposure time corresponds to the first wavelength, and the second exposure time corresponds to a second wavelength. In a case that the first exposure time is greater than the second exposure time, the first wavelength is greater than the second wavelength. According to the formula 2, in a case that first wavelength is greater than the second wavelength, the second interference pattern is obtained after the first interference pattern is enlarged. In a case that the first exposure time is less than the second exposure time, the first wavelength is less than the second wavelength. According to the formula 2, in a case that the first wavelength is less than the second wavelength, the second interference pattern is obtained after the first interference pattern is linearly decreased.

In an implementation, an enlarged or a decreased value of the interference pattern is a value of $\frac{dr}{d\lambda}$ calculated according to the formula 2.

Optionally, in a case that the first exposure time is equal to the second exposure time, the first wavelength is equal to the second wavelength, and in a case that the first wavelength is equal to the second wavelength, the first interference pattern is the second interference pattern.

Optionally, in some embodiments, in a case that an absolute value of a difference between the first exposure time and the second exposure time is less than a preset threshold (for example, 20 μs), the first interference pattern is determined as the second interference pattern.

S906. Eliminate the second interference pattern in the first image, to obtain the first image in which the interference pattern is eliminated.

A gain of the first image is calculated according to the second interference pattern, and gain compensation is performed on the first image, to obtain the first image in which the interference pattern is eliminated. In an implementation, by dividing the first image by the second interference pattern, the first image in which the interference pattern is eliminated is obtained.

Based on the foregoing principle, the exposure time of the ToF under the screen changes with the ambient light intensity. In a case that ambient light is dark (the ambient light intensity is weak), an exposure time of the ToF is long, and a temperature of a laser emitter rises, the wavelength of the laser is lengthened. In a case that the ambient light is bright (the ambient light intensity is strong), the exposure time of the ToF is short, and the temperature of the laser emitter decreases, the wavelength of the laser is shortened. In a case that the wavelength of the laser emitted by the ToF under the screen changes, a radius of each circular ring in the interference pattern changes. According to the method for eliminating an interference pattern in an image provided in this embodiment of this application, K interference patterns corresponding to K different exposure times of the ToF are obtained in advance. After the ToF under the screen collects the first image, by comparing the exposure time for the ToF to collect the first image with the K different exposure times, an exposure time that is most approximate to the exposure time for the ToF to collect the first image is found in the K different exposure times. An interference pattern corresponding to the most approximate exposure time is linearly enlarged or decreased, to obtain the interference pattern in the first image. In this way, the interference pattern in the first image can be eliminated.

Figure 10:
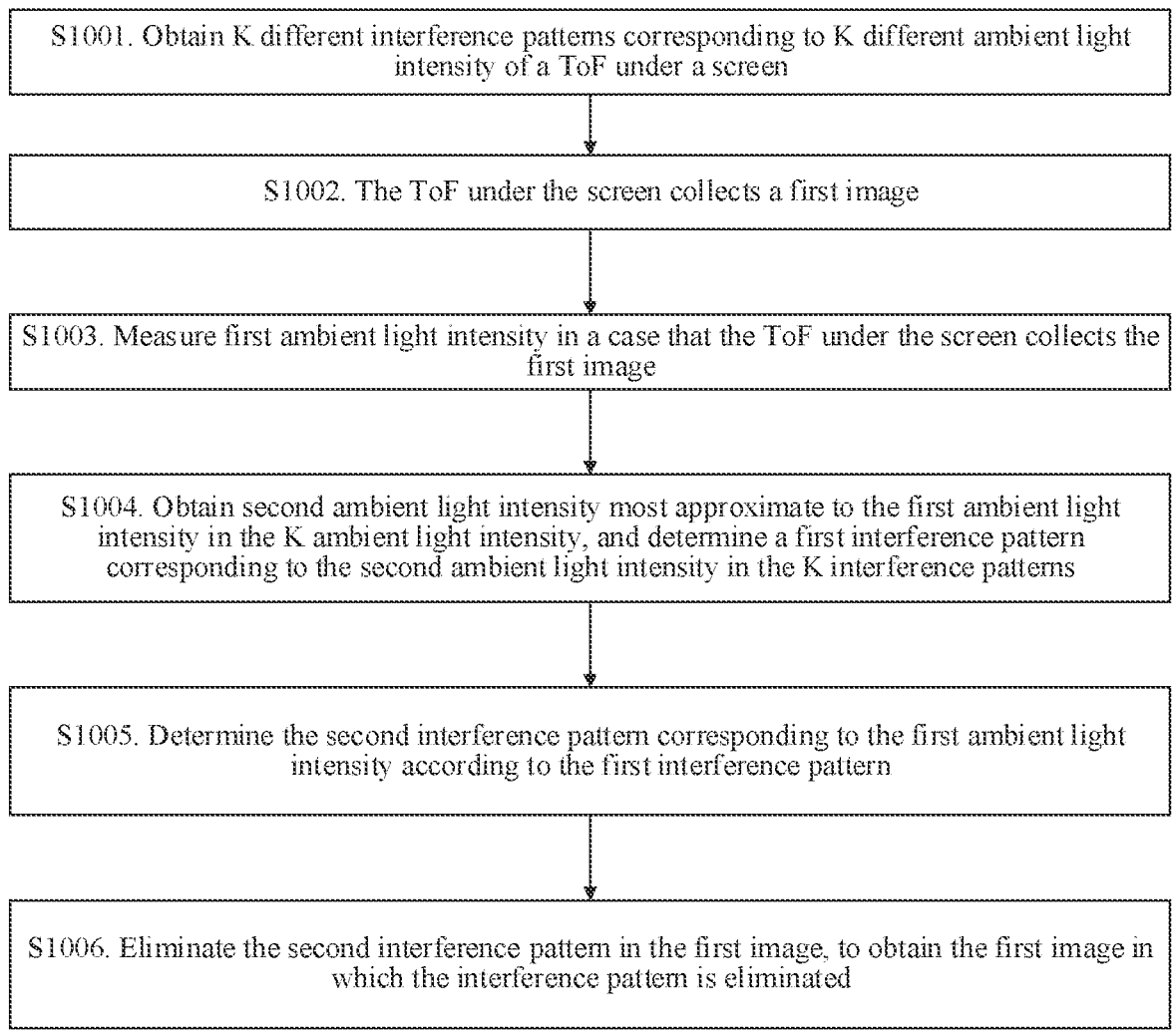
FIG. 10 is a schematic flowchart of a method for eliminating an interference pattern in an image according to an embodiment of this application.

In another example, FIG. 10 is a schematic flowchart of a method for eliminating an interference pattern in an image according to an embodiment of this application. In this method, different interference patterns corresponding to different wavelengths are obtained by monitoring ambient light intensity around a ToF under a screen. As shown in FIG. 10, the method may include:

S1001. Obtain K different interference patterns corresponding to K different ambient light intensity of a ToF under a screen.

The weaker the ambient light intensity around the ToF under the screen is, the longer the exposure time for collecting an image is, and therefore the longer a wavelength of laser emitted by the ToF under the screen is. There is a linear relationship and a one-to-one correspondence between the wavelength of the laser emitted by the ToF under the screen and the surrounding ambient light intensity in a case that the ToF collects the image. The K different interference patterns corresponding to the K different ambient light intensity of the ToF under the screen are obtained, that is, K different interference patterns corresponding to K different wavelengths of the laser emitted by the ToF under the screen are obtained.

In an implementation, an ambient light sensor is arranged inside or beside a ToF assembly. Ambient light intensity around the ToF assembly may be obtained through the ambient light sensor. The ToF under the screen collects the K interference patterns corresponding to the K different ambient light intensity, where K>1.

S1002. The ToF under the screen collects a first image.

The ToF under the screen collects the first image of a to-be-measured object. For example, in a case that the to-be-measured object is a face, the first image is a three-dimensional image of the face. Since the ToF is located under the screen, the first image includes an interference pattern. Exemplarily, the first image is shown in FIG. 2A, and the three-dimensional image of the face includes an interference pattern, that is, a bright-dark concentric ring.

In a case that the ToF under the screen collects the first image, the ambient light intensity is denoted as first ambient light intensity. The first ambient light intensity corresponds to a first exposure time, a first temperature of a laser emitter, and a first wavelength of the emitted laser. According to the principle of the formula 1, the first wavelength corresponds to a second interference pattern, that is, the first image includes the second interference pattern.

S1003. Measure the first ambient light intensity in a case that the ToF under the screen collects the first image.

In an implementation, the ambient light intensity around the ToF assembly is monitored in real time through the ambient light sensor, that is, the first ambient light intensity in a case that the ToF under the screen collects the first image is obtained.

It should be noted that an order of performing the foregoing S1002 and S1003 is not limited in this embodiment of this application. The first image may be collected first and then the first ambient light intensity corresponding to the first image is obtained, or the first ambient light intensity may be obtained first and then the first image corresponding to the first ambient light intensity is obtained, or S1002 and S1003 are performed simultaneously. The order of performing S1002 and S1003 does not affect an implementation effect of this embodiment of this application.

S1004. Obtain second ambient light intensity most approximate to the first ambient light intensity in the K ambient light intensity, and determine a first interference pattern corresponding to the second ambient light intensity in the K interference patterns.

Absolute values of differences between the first ambient light intensity and the K ambient light intensity are compared, to obtain the second ambient light intensity most approximate to the first ambient light intensity in the K ambient light intensity. In an example, a difference between the second ambient light intensity and the first ambient light intensity is less than or equal to a first value. Exemplarily, the K ambient light intensity is respectively 0 lux, 200 lux, 400 lux, 600 lux, 800 lux, 1000 lux, and 1500 lux. For example, in a case that the first ambient light intensity is 570 lux, a difference between 0 lux and 570 lux is 570 lux, a difference between 200 lux and 570 lux is 370 lux, a difference between 400 lux and 570 lux is 170 lux, a difference between 600 lux and 570 lux is 30 lux, a difference between 800 lux and 570 lux is 230 lux, a difference between 1000 lux and 570 lux is 430 lux, and a difference between 1500 lux and 570 lux is 930 lux, where the difference between 600 lux and 570 is the smallest, and the difference (30 lux) is less than the first value, for example, the first value is 100 lux. In this case, the second ambient light intensity most approximate to the first ambient light intensity is 600 lux. For example, in a case that the first ambient light intensity is 404 lux, a difference between 400 lux and 404 lux is the smallest, and the difference (4 lux) is less than the first value, for example, the first value is 100 lux. In this case, the second ambient light intensity most approximate to the first ambient light intensity is 400 lux. In an implementation, in a case that absolute values of differences between the first ambient light intensity and two adjacent ambient light intensity in the K ambient light intensity are equal, one of the two ambient light intensity that is greater than the first ambient light intensity is determined as the second ambient light intensity. For example, in a case that the first ambient light intensity is 500 lux, differences between 400 lux and 500 lux and between 600 lux and 500 lux are both 100 lux, and the difference (100 lux) is equal to the first value, for example, the first value is 100 lux. In this case, the second ambient light intensity most approximate to the first ambient light intensity is 600 lux.

In the K interference patterns, the first interference pattern corresponding to the second ambient light intensity is determined.

S1005. Determine the second interference pattern corresponding to the first ambient light intensity according to the first interference pattern.

The first ambient light intensity corresponds to the first wavelength, and the second ambient light intensity corresponds to a second wavelength. In a case that the first ambient light intensity is less than the second ambient light intensity, the first wavelength is greater than the second wavelength. According to the formula 2, in a case that first wavelength is greater than the second wavelength, the second interference pattern is obtained after the first interference pattern is enlarged. In a case that the first ambient light intensity is greater than the second ambient light intensity, the first wavelength is less than the second wavelength. According to the formula 2, in a case that the first wavelength is less than the second wavelength, the second interference pattern is obtained after the first interference pattern is linearly decreased. Optionally, in a case that the first ambient light intensity is equal to the second ambient light intensity, the first wavelength is equal to the second wavelength, and in a case that the first wavelength is equal to the second wavelength, the first interference pattern is the second interference pattern. Optionally, in some embodiments, in a case that an absolute value of a difference between the first ambient light intensity and the second ambient light intensity is less than a preset threshold (for example, 10 lux), the first interference pattern is directly determined as the second interference pattern.

In an implementation, an enlarged or a decreased value of the interference pattern is a value of $\frac{dr}{d\lambda}$ calculated according to the formula 2.

S1006. Eliminate the second interference pattern in the first image, to obtain the first image in which the interference pattern is eliminated.

A gain of the first image is calculated according to the second interference pattern, and gain compensation is performed on the first image, to obtain the first image in which the interference pattern is eliminated. In an implementation, by dividing the first image by the second interference pattern, the first image in which the interference pattern is eliminated is obtained.

Based on the foregoing principle, the exposure time of the ToF under the screen changes with the ambient light intensity. In a case that ambient light is dark (the ambient light intensity is weak), the exposure time of the ToF is long, the temperature of the laser emitter rises, and the wavelength of the laser is lengthened. In a case that the ambient light is bright (the ambient light intensity is strong), the exposure time of the ToF is short, the temperature of the laser emitter decreases, and the wavelength of the laser is shortened. In a case that the wavelength of the laser emitted by the ToF under the screen changes, a radius of each circular ring in the interference pattern changes. According to the method for eliminating an interference pattern in an image provided in this embodiment of this application. K interference patterns corresponding to K different ambient light intensity are obtained in advance. After the ToF under the screen collects the first image, by comparing the ambient light intensity in a case that the ToF collects the first image with the K different ambient light intensity, ambient light intensity that is most approximate to the ambient light intensity in a case that the ToF collects the first image is found in the K different ambient light intensity. An interference pattern corresponding to the most approximate ambient light intensity is linearly enlarged or decreased, to obtain the interference pattern in the first image. In this way, the interference pattern in the first image can be eliminated.

Figure 11:
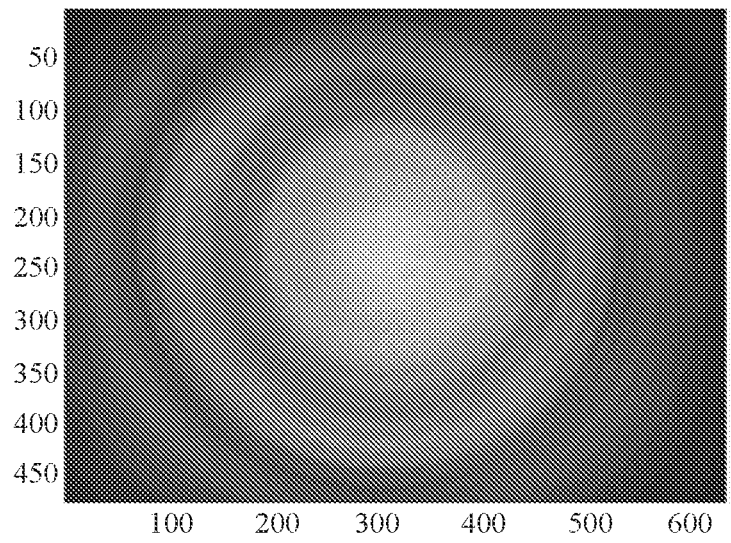
FIG. 11 is a schematic diagram of an example of a method for eliminating an interference pattern in an image according to an embodiment of this application.
Figure 11:
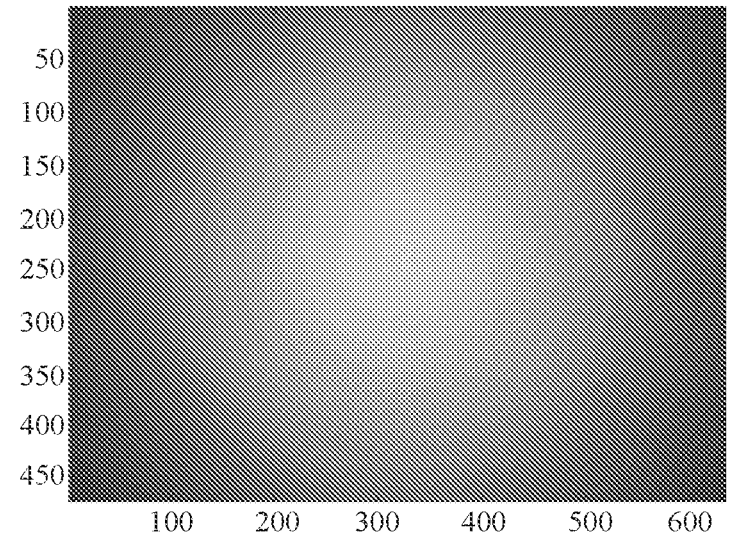

By using the method for eliminating an interference pattern in an image provided in the embodiments of this application, the interference pattern in the image collected by the ToF under the screen can be effectively eliminated. Exemplarily, in a case that the to-be-measured object is a face, the image collected by the ToF under the screen is shown in FIG. 2A and includes an interference pattern, that is, a light-dark concentric ring. An image in which the interference pattern is eliminated by using the method for eliminating an interference pattern in an image provided in the embodiments of this application is shown in FIG. 2C, and the interference pattern is effectively eliminated. Exemplarily, in a case that the to-be-measured object is a reflector plate, the image collected by the ToF under the screen is shown in FIG. 11(a) and includes an interference pattern, that is, a light-dark concentric ring. An image in which the interference pattern is eliminated by using the method for eliminating an interference pattern in an image provided in the embodiments of this application is shown in FIG. 11(b), and the interference pattern is effectively eliminated.

It should be noted that the method for eliminating an interference pattern in an image provided in the embodiments of this application are described above by taking examples in which the interference patterns are respectively determined through the wavelength of the laser, the temperature of the ToF, the exposure time for collecting the image, and the ambient light intensity around the ToF under the screen. It should be noted that, in some other embodiments, the interference pattern may be determined through another parameter (for example, a parameter that causes the wavelength of the laser to be changed, or a parameter that represents a change in the wavelength of the laser), and this is not limited in the embodiments of this application.

An embodiment of this application further provides a method for generating an interference pattern.

According to the foregoing formula 1, an interference pattern generated in a case that laser with a designated wavelength is refracted once between screen layers may be generated. A value of n is a refractive index of a screen layer in which refraction occurs, a value of h is a thickness of the screen layer in which refraction occurs, a value of λ is the designated wavelength, and f is a focal length of a lens of the ToF. In this way, a radius of a circular ring corresponding to each interference order can be calculated according to the formula 1, that is, an interference pattern generated due to one time of refraction is obtained.

In a case that the laser is refracted for many times when passing through the screen, the interference pattern included in the image collected by the ToF under the screen is generated by superimposing interference patterns generated due to a plurality of times of refraction. In an example, the interference pattern included in the image collected by the ToF under the screen may be obtained through the formula 3.

$$\text{Interference pattern} = (\text{interference light 1} + \text{interference light 2} + \ldots + \text{interference light } N + \text{non-interference light}) * \text{relative illuminance of lens} \quad \text{Formula 3}$$

The interference light 1 is an interference pattern generated in a case that the laser with the designated wavelength is refracted between the screen layers for the first time, the interference light 2 is an interference pattern generated in a case that the laser with the designated wavelength is refracted between the screen layers for the second time, the interference light N is an interference pattern generated in a case that the laser with the designated wavelength is refracted between the screen layers for the Nth time, and the non-interference light is a pattern generated in a case that the laser passes through the screen. The relative illuminance of lens can be calculated according to an optical design of the lens of the ToF under the screen.

Figure 12:
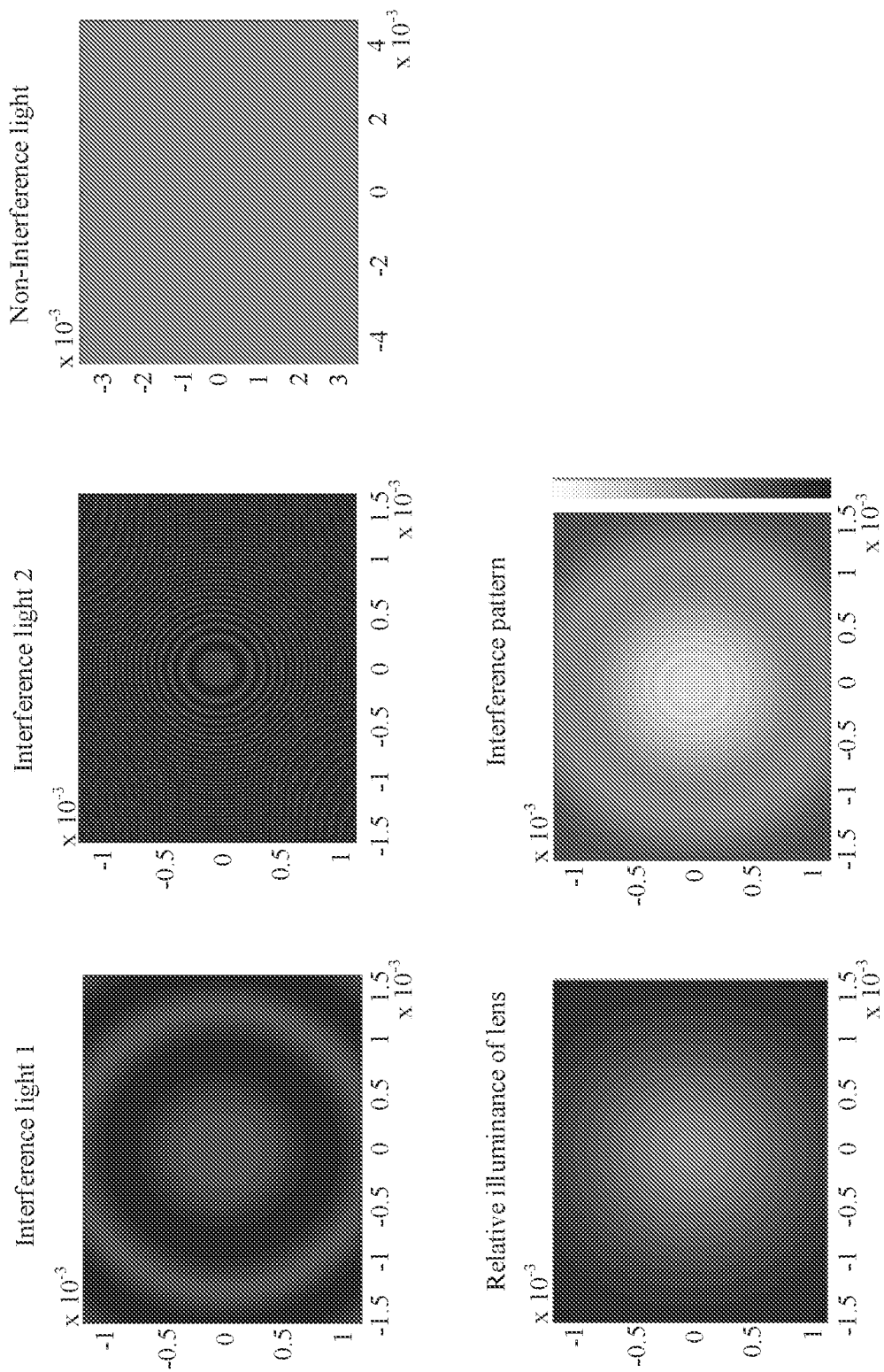
FIG. 12 is a schematic diagram of an example of a method for generating an interference pattern according to an embodiment of this application.

Exemplarily, FIG. 12 is a schematic diagram of an example in which an interference pattern is obtained according to the formula 3. In this example, the interference pattern is generated in a case that the laser is refracted twice between the screen layers. An interference layer of the interference light 1 is relatively thick, an interference layer of the interference light 2 is relatively thin, and the non-interference light is evenly distributed light. A ratio between intensity of the three part of light is about 4:1:10. It may be understood that the ratio between the intensity of the various parts of light may be set according to a structure, a material, and the like of the screen.

An interference pattern may be generated as required by using the method for generating an interference pattern provided in this embodiment of this application. For example, the K interference patterns corresponding to the K different wavelengths of the laser in the foregoing embodiments are generated. For example, the second interference pattern corresponding to the first wavelength is generated, so that the interference pattern in the first image can be conveniently eliminated according to the second interference pattern.

Figure 13:
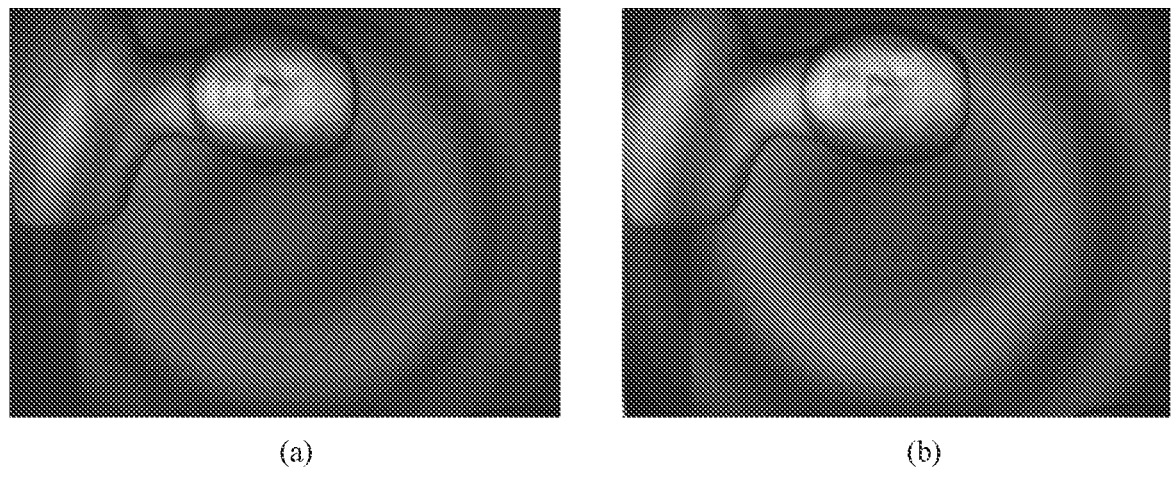
FIG. 13 is a schematic diagram of an example of a method for generating an interference pattern according to an embodiment of this application.

In some embodiments, the generated interference patterns may be superimposed on pictures, to generate a large quantity of images including interference patterns. The large quantity of images including interference patterns are used as a data set, and interference pattern elimination training is performed by using a deep learning algorithm. In this way, image processing may be performed by using the deep learning algorithm, to eliminate the interference pattern in the image. A large quantity of images including interference patterns can be quickly generated by using the method for generating an interference pattern provided in this embodiment of this application, thereby meeting a requirement of the deep learning algorithm for training data. Exemplarily, FIG. 13(*a*) shows an image that includes an interference pattern and is collected by the ToF under the screen. FIG. 13(*b*) shows an image that includes an interference pattern and is generated by using the method for generating an interference pattern provided in this embodiment of this application. It can be seen that effects of FIG. 13(*a*) and FIG. 13(*b*) are basically the same.

It may be understood that to achieve the foregoing functions, the electronic device provided in the embodiments of this application includes corresponding hardware structures and/or software modules for performing the functions. A person skilled in the art should be easily aware that, in combination with the units and algorithm steps of examples described in the embodiments disclosed in this specification, the embodiments of this application can be implemented by hardware or a combination of hardware and computer software. Whether a function is implemented by hardware or computer software driving hardware depends on particular applications and design constraints of the technical solutions. A person skilled in the art may use different methods to implement the described functions for each particular application, but it should not be considered that the implementation goes beyond the scope of the embodiments of this application.

In the embodiments of this application, functional modules of the electronic device may be divided based on the foregoing method examples. For example, each functional module may be divided according to each function, or two or more functions may be integrated into one processing module. The integrated module may be implemented in the form of hardware, or may be implemented in the form of a software functional module. It should be noted that module division in this embodiment of this application is an example and is merely logical function division. During actual implementation, there may be another division manner.

Figure 14:
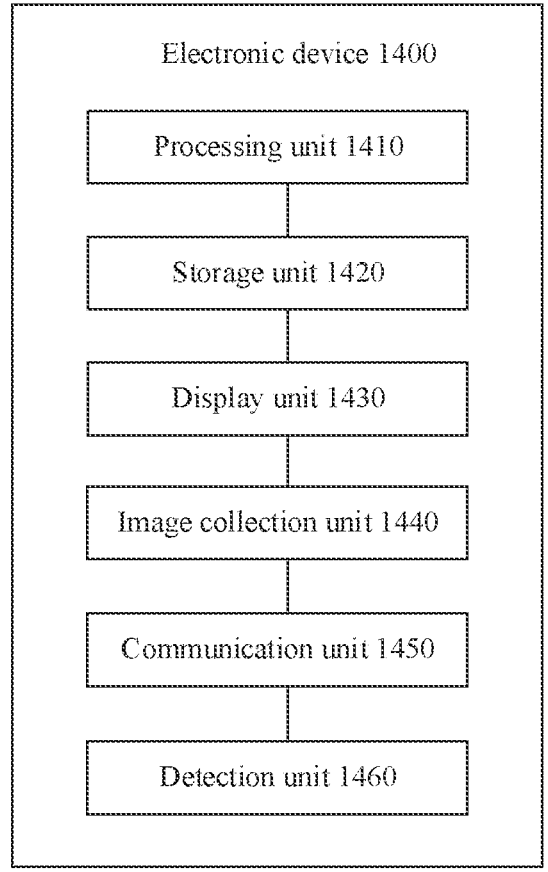
FIG. 14 is a schematic structural diagram of an electronic device according to an embodiment of this application.

In an example, FIG. 14 is a schematic diagram of a possible structure of the electronic device involved in the foregoing embodiments. The electronic device 1400 includes a processing unit 1410 and a storage unit 1420.

The processing unit 1410 is configured to control and manage an operation of the electronic device 1400. For example, the second interference pattern is obtained by enlarging or decreasing the first interference pattern. For example, the first image in which the interference pattern is eliminated is obtained by eliminating the second interference pattern in the first image.

The storage unit 1420 is configured to store program code and data of the electronic device 1400.

Certainly, unit modules in the electronic device 1400 includes, but are not limited to, the processing unit 1410 and the storage unit 1420.

Optionally, the electronic device 1400 may further include a display unit 1430. The display unit 1430 is configured to display an interface of the electronic device 1400, for example, to display the first image in which the interference pattern is eliminated.

Optionally, the electronic device 1400 may further include an image collection unit 1440. The image collection unit 1440 is configured to collect an image, for example, to collect an image of a to-be-measured object, and for example, to collect K different interference patterns.

Optionally, the electronic device 1400 may further include a communication unit 1450. The communication unit 1450 is configured to support communication between the electronic device 1400 and another device, for example, to support obtaining of a to-be-measured object from another device, and for example, to support obtaining of K different interference patterns from another device.

Optionally, the electronic device 1400 may further include a detection unit 1460. The detection unit 1460 is configured to detect data in the running process of the electronic device 1400, for example, to detect a temperature of a ToF assembly, and for example, to detect ambient light intensity, and the like.

The processing unit 1410 may be a processor or a controller, for example, may be a central processing unit (central processing unit, CPU), a digital signal processor (digital signal processor, DSP), an application-specific integrated circuit (application-specific integrated circuit, ASIC), a field programmable gate array (field programmable gate array, FPGA) or another programmable logical device, a transistor logical device, a hardware component, or a combination thereof. The storage unit 1420 may be a memory. The display unit 1430 may be a display screen or the like. The image collection unit 1440 may be a camera or the like. The communication unit 1450 may include a mobile communication unit and/or a wireless communication unit. The detection unit 1460 may be a sensor.

For example, the processing unit 1410 is a processor (the processor 110 shown in FIG. 3), the storage unit 1420 may be a memory (the internal memory 121 shown in FIG. 3), and the display unit 1430 may be a display screen (the display screen 191 shown in FIG. 3). The image collection unit 1440 may be a camera (the ToF assembly 192 shown in FIG. 3). The communication unit 1450 may include a mobile communication unit (the mobile communication module 150 shown in FIG. 3) and a wireless communication unit (the wireless communication module 160 shown in FIG. 3). The detection unit 1460 may be a sensor (the sensor module 180 shown in FIG. 3). The electronic device 1400 provided in this embodiment of this application may be the electronic device 100 shown in FIG. 3. The foregoing processor, memory, display screen, camera, mobile communication unit, wireless communication unit, sensor, and the like may be connected to each other by using, for example, a bus.

An embodiment of this application further provides a chip system. The chip system includes at least one processor and at least one interface circuit. The processor may be interconnected to the interface circuit by using a line. In an example, the interface circuit may be configured to receive a signal from another apparatus (such as the memory of the electronic device). In another example, the interface circuit may be configured to transmit a signal to another apparatus (for example, the processor). Exemplarily, the interface circuit may read the instructions stored in the memory and send the instructions to the processor. The instructions, when executed by the processor, may cause the electronic device to perform the steps in the foregoing embodiments. Certainly, the chip system may further include other discrete devices. This is not specifically limited in this embodiment of this application.

An embodiment of this application further provides a computer-readable storage medium, including a computer instruction, the computer instruction, when running on the electronic device, causing the electronic device to perform the functions or steps performed by the mobile phone in the method embodiments.

An embodiment of this application further provides a computer program product, the computer program product, when running on a computer, causing the computer to perform the functions or steps performed by the mobile phone in the method embodiments.

Through the descriptions of the foregoing implementations, a person skilled in the art may clearly understand that, for the purpose of convenient and brief description, only division of the foregoing functional modules is used as an example for description. In actual application, the foregoing functions may be allocated to and completed by different functional modules according to requirements. That is, an inner structure of an apparatus is divided into different functional modules to complete all or some of the functions described above.

In the several embodiments provided in this application, it should be understood that the disclosed apparatus and method may be implemented in other manners. For example, the described apparatus embodiment is merely exemplary. For example, the module or unit division is merely a logical function division and may be other division during actual implementations. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed in multiple different places. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in the form of hardware, or may be implemented in the form of a software functional unit.

When the integrated unit is implemented in the form of a software functional unit and sold or used as an independent product, the integrated unit may be stored in a readable storage medium. Based on such an understanding, the technical solutions in the embodiments of this application essentially, or the part contributing to the prior art, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or a compact disc.

The foregoing content is only specific implementations of this application, but is not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method for eliminating an interference pattern in an image, applicable to an electronic device, the electronic device comprising a display screen, a time of flight (ToF) sensor being arranged under the display screen, the ToF sensor comprising an emitting unit and a receiving unit, and the method comprising:
obtaining K interference patterns, wherein the K interference patterns correspond to K different values of a same parameter, and each of the interference patterns is a bright-dark concentric ring generated based on a laser emitted by the emitting unit passing through the display screen;
collecting, by the receiving unit, a first image;
measuring a first parameter value responsive to the receiving unit collecting the first image;
determining a first interference pattern in the K interference patterns, wherein the first interference pattern corresponds to a second parameter value, and wherein a difference between the second parameter value and the first parameter value is less than or equal to a first value; and eliminating a second interference pattern in the first image, wherein the second interference pattern is determined according to the first interference pattern.

2. The method of claim 1, wherein the parameter is one of a temperature, or a wavelength of the laser emitted by the emitting unit, or an exposure time for the receiving unit to collect an image, or an ambient light intensity.

3. The method of claim 1, wherein the second interference pattern being determined according to the first interference pattern comprises the second interference pattern being the first interference pattern.

4. The method of claim 1, wherein the second interference pattern being determined according to the first interference pattern comprises:
  either a) the second interference pattern being generated by enlarging a radius of each circular ring in the first interference pattern; or
  b) the second interference pattern being generated by decreasing a radius of each circular ring in the first interference pattern.

5. The method of claim 2, wherein determining the second interference pattern according to the first interference pattern comprises:
  either a) when the first parameter value is greater than the second parameter value, the second interference pattern being generated by enlarging a radius of each circular ring in the first interference pattern; or
  b) when the first parameter value is less than the second parameter value, the second interference pattern being generated by decreasing a radius of each circular ring in the first interference pattern.

6. The method of claim 2, wherein when the parameter is the ambient light intensity in a case that the receiving unit collects the image, the second interference pattern is determined according to the first interference pattern comprises:
  either a) when the first parameter value is less than the second parameter value, the second interference pattern being generated by enlarging a radius of each circular ring in the first interference pattern; or
  b) when the first parameter value is greater than the second parameter value, the second interference pattern being generated by decreasing a radius of each circular ring in the first interference pattern.

7. The method of claim 4, wherein enlarging or decreasing the radius of each circular ring in the first interference pattern comprises an enlarged value or a decreased value of a radius of a circular ring of an m-th interference order in the first interference pattern being:

$$(4f^2h^2n)/\lambda^2 m_i^2 \sqrt{\frac{4f^2h^2n^2}{\lambda^2 m_i^2} - f^2},$$

wherein $\lambda$ is a wavelength of the laser emitted by the emitting unit, f is a focal length of a lens of the ToF sensor, n is a refractive index of a screen layer in which refraction occurs in the display screen, and h is a thickness of the screen layer in which refraction occurs in the display screen.

8. The method of claim 1, wherein generating each of the interference patterns comprises each of the interference patterns being generated based on the receiving unit receiving a reflection from an object through the display screen of the laser emitted by the emitting unit, or being generated based on the receiving unit receiving a reflection from an object of the laser emitted by the emitting unit passing through the display screen.

9. The method of claim 1, wherein in a case that a difference between a third parameter value and the first parameter value is equal to the difference between the second parameter value and the first parameter value, the second parameter value is greater than the third parameter value.

10. An electronic device, comprising:
  one or more processors;
  a display screen, wherein a time of flight (ToF) sensor is arranged under the display screen, wherein the ToF sensor comprises an emitting unit and a receiving unit; and
  a memory coupled to the one or more processors and configured to store computer instructions that, when executed by the electronic device, cause the electronic device to be configured to:
    obtain K interference patterns, wherein the K interference patterns correspond to K different values of a same parameter, and each of the interference patterns is a bright-dark concentric ring generated based on laser emitted by the emitting unit passing through the display screen;
    collect, by the receiving unit, a first image;
    measure a first parameter value responsive to the receiving unit collecting the first image;
    determine a first interference pattern in the K interference patterns, wherein the first interference pattern corresponds to a second parameter value, and wherein a difference between the second parameter value and the first parameter value is less than or equal to a first value; and
    eliminate a second interference pattern in the first image, wherein the second interference pattern is determined according to the first interference pattern.

11. The electronic device of claim 10, wherein the parameter is one of a temperature, or a wavelength of the laser emitted by the emitting unit, or an exposure time for the receiving unit to collect an image, or ambient light intensity.

12. The electronic device of claim 10, wherein the second interference pattern being determined according to the first interference pattern comprises the second interference pattern being the first interference pattern.

13. The electronic device of claim 10, wherein the second interference pattern being determined according to the first interference pattern comprises:
  either a) the second interference pattern being generated by enlarging a radius of each circular ring in the first interference pattern; or
  b) the second interference pattern being generated by decreasing a radius of each circular ring in the first interference pattern.

14. The electronic device of claim 11, wherein determining the second interference pattern according to the first interference pattern comprises:
  either a) when the first parameter value is greater than the second parameter value, the second interference pattern being generated by enlarging a radius of each circular ring in the first interference pattern; or
  b) when the first parameter value is less than the second parameter value, the second interference pattern being generated by decreasing a radius of each circular ring in the first interference pattern.

15. The electronic device of claim 11, wherein when the parameter is the ambient light intensity in a case that the receiving unit collects the image, the second interference pattern is determined according to the first interference pattern comprises:

either a) when the first parameter value is less than the second parameter value, the second interference pattern being generated by enlarging a radius of each circular ring in the first interference pattern; or b) when the first parameter value is greater than the second parameter value, the second interference pattern being generated by decreasing a radius of each circular ring in the first interference pattern.

16. The electronic device of claim 10, wherein generating each of the interference patterns comprises each of the interference patterns being generated based on the receiving unit receiving a reflection from an object through the display screen of the laser emitted by the emitting unit, or being generated based on the receiving unit receiving a reflection from an object of the laser emitted by the emitting unit passing through the display screen.

17. A non-transitory computer-readable storage medium comprising instructions that, when executed by a processor, cause the processor to be configured to:

obtain K interference patterns, wherein the K interference patterns correspond to K different values of a same parameter, and each of the interference patterns is a bright-dark concentric ring generated based on a laser emitted by the an emitting unit of a sensor passing through a display screen;

collect, by a receiving unit of the sensor, a first image;

measure a first parameter value responsive to the receiving unit collecting the first image;

determine a first interference pattern in the K interference patterns, wherein the first interference pattern corresponds to a second parameter value, and wherein a difference between the second parameter value and the first parameter value is less than or equal to a first value; and eliminate a second interference pattern in the first image, wherein the second interference pattern is determined according to the first interference pattern.

18. The non-transitory computer-readable storage medium of claim 17, wherein the parameter is one of a temperature, or a wavelength of the laser emitted by the emitting unit, or an exposure time for the receiving unit to collect an image, or ambient light intensity.

19. The non-transitory computer-readable storage medium of claim 17, wherein the second interference pattern being determined according to the first interference pattern comprises the second interference pattern being the first interference pattern.

20. The non-transitory computer-readable storage medium of claim 17, wherein the second interference pattern being determined according to the first interference pattern comprises:

either a) the second interference pattern being generated by enlarging a radius of each circular ring in the first interference pattern; or b) the second interference pattern being generated by decreasing a radius of each circular ring in the first interference pattern.

* * * * *